US012785011B2

(12) United States Patent
Lin et al.

(10) Patent No.: US 12,785,011 B2
(45) Date of Patent: Nov. 3, 2026

(54) KEY STRUCTURE

(71) Applicant: LITE-ON TECHNOLOGY CORPORATION, Taipei (TW)

(72) Inventors: Ko-Hsiang Lin, Taipei (TW); Chun-Lin Chen, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 260 days.

(21) Appl. No.: 18/374,295

(22) Filed: Sep. 28, 2023

(65) Prior Publication Data

US 2024/0120162 A1 Apr. 11, 2024

Related U.S. Application Data

(60) Provisional application No. 63/413,975, filed on Oct. 7, 2022.

(51) Int. Cl.
*H01H 13/705* (2006.01)
*H01H 13/14* (2006.01)
(Continued)

(52) U.S. Cl.
CPC .......... *H01H 13/705* (2013.01); *H01H 13/26* (2013.01); *H01H 13/86* (2013.01); *H01H 13/14* (2013.01)

(58) Field of Classification Search
CPC ........... H01H 2003/00; H01H 2003/02; H01H 2003/12; H01H 2013/00; H01H 2013/02; H01H 2013/50; H01H 2013/52; H01H 2221/00; H01H 9/02; H01H 9/0214; H01H 9/0235; H01H 9/0271; H01H 9/20; H01H 9/22; H01H 13/00; H01H 13/04; H01H 13/10; H01H 13/12; H01H 13/14; H01H 13/50; H01H 13/52; H01H 13/70; H01H 13/702; H01H 13/26; H01H 13/705;
(Continued)

(56) References Cited

U.S. PATENT DOCUMENTS 4,366,355 A * 12/1982 Oelsch ................. H01H 13/705 200/517
4,638,151 A * 1/1987 Suwa ................... H01H 13/705 235/145 R
(Continued)

FOREIGN PATENT DOCUMENTS

CN 204834423 U 12/2015
CN 108074769 A 5/2018
(Continued)

OTHER PUBLICATIONS

Office Action issued by Taiwan Intellectual Property Office on Apr. 30, 2024.

*Primary Examiner* — Anthony R Jimenez
(74) *Attorney, Agent, or Firm* — WPAT, PC

(57) ABSTRACT

A key structure is provided. The key structure includes an elastic element and a keycap disposed on the elastic element. The elastic element includes a movable portion, a fixed portion and a connection portion. The fixed portion surrounds the movable portion. The connection portion connects the fixed portion with the movable portion. The keycap includes a first connection portion. The first connection portion is connected to the fixed portion or the movable portion.

19 Claims, 20 Drawing Sheets

(51) Int. Cl.
*H01H 13/26* (2006.01)
*H01H 13/86* (2006.01)

(58) Field of Classification Search
CPC H01H 13/86; H01H 3/00; H01H 3/12; H01H 3/02
USPC .......................................................... 200/341
See application file for complete search history.

(56) References Cited

U.S. PATENT DOCUMENTS

| | | | | | |
|---|---|---|---|---|---|
| 5,203,448 | A * | 4/1993 | Osada | H01H 13/705 | |
| | | | | 200/341 | |
| 5,389,757 | A * | 2/1995 | Souliere | H01H 13/705 | |
| | | | | 200/345 | |
| 6,100,484 | A * | 8/2000 | Houze | H01H 13/807 | |
| | | | | 200/512 | |
| 2017/0154741 | A1 * | 6/2017 | Chen | H04B 1/3833 | |

FOREIGN PATENT DOCUMENTS

| | | | |
|---|---|---|---|
| CN | 213459523 | U | 6/2021 |
| TW | 570278 | U | 1/2004 |
| TW | M478900 | U | 5/2014 |

* cited by examiner

KEY STRUCTURE

This application claims the benefit of U.S. provisional application Ser. No. 63/413,975, filed Oct. 7, 2022, the subject matter of which is incorporated herein by reference.

BACKGROUND OF THE INVENTION

Field of the Invention

The invention relates in general to a key structure.

Description of the Related Art

A conventional key structure connects a keycap through a lifting mechanism. The lifting mechanism may lift based on the release or pressing for the keycap. The lifting mechanism includes a plurality of separately formed rods which are manufactured separately and then pivoted to each other to form a movable mechanism. However, the lifting mechanism itself has many elements (more complicated), and a plurality of the lifting mechanisms must be assembled to the base plate one by one in the assembly process of the key structure, and it is quite inefficient.

SUMMARY OF THE INVENTION

The present invention relates to a key structure capable of resolving existing problems disclosed above.

According to an embodiment of the present invention, a key structure is provided. The key structure includes an elastic element and a keycap disposed on the elastic element. The elastic element includes a movable portion, a fixed portion and a connection portion. The fixed portion surrounds the movable portion. The connection portion connects the fixed portion with the movable portion. The keycap includes a first connection portion. The first connection portion is connected to the fixed portion or the movable portion.

According to another embodiment of the present invention, a key structure is provided. The key structure includes a keycap, a bracket, a trigger body, and a switch. The trigger body is disposed between the keycap and the bracket. The switch is disposed at a position corresponding to the trigger. The keycap is directly connected to the bracket.

The above and other aspects of the invention will become better understood with regard to the following detailed description of the preferred but non-limiting embodiment (s). The following description is made with reference to the accompanying drawings.

DETAILED DESCRIPTION OF THE INVENTION

Detailed descriptions of the present invention are disclosed below with accompanying drawings and exemplary embodiments. The descriptions, accompanying drawings and exemplary embodiments disclosed below are not for limiting the scope of protection of the present invention.

Figure 1A:
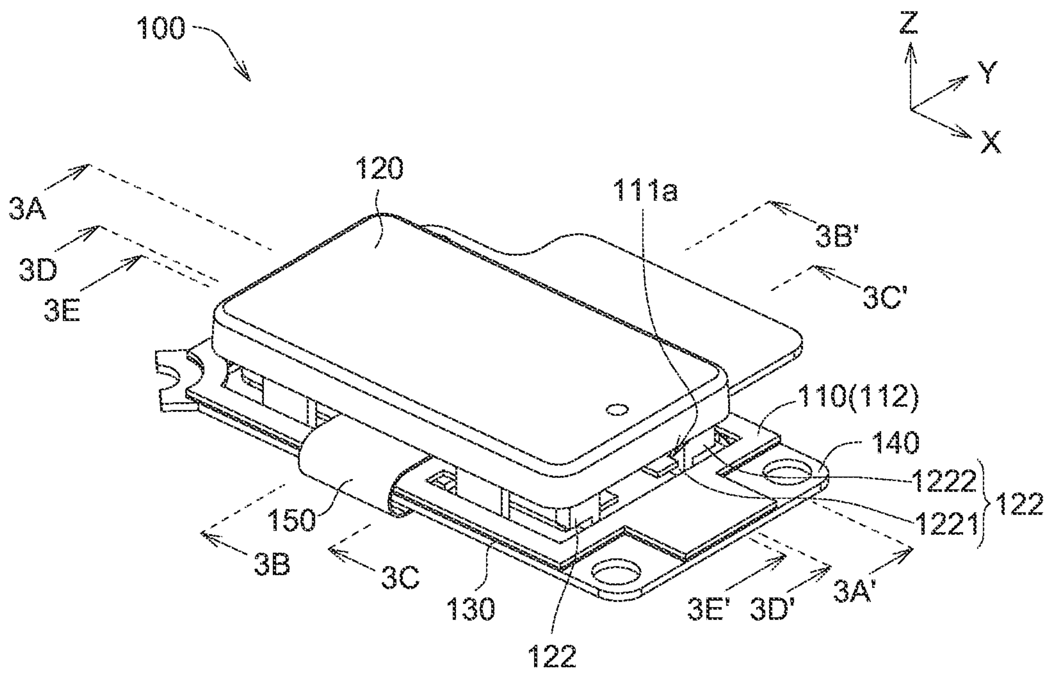
FIGS. 1A and 1B show schematic diagrams of combination views of a key structure according to an embodiment of the present invention in different viewing angles.
Figure 1B:
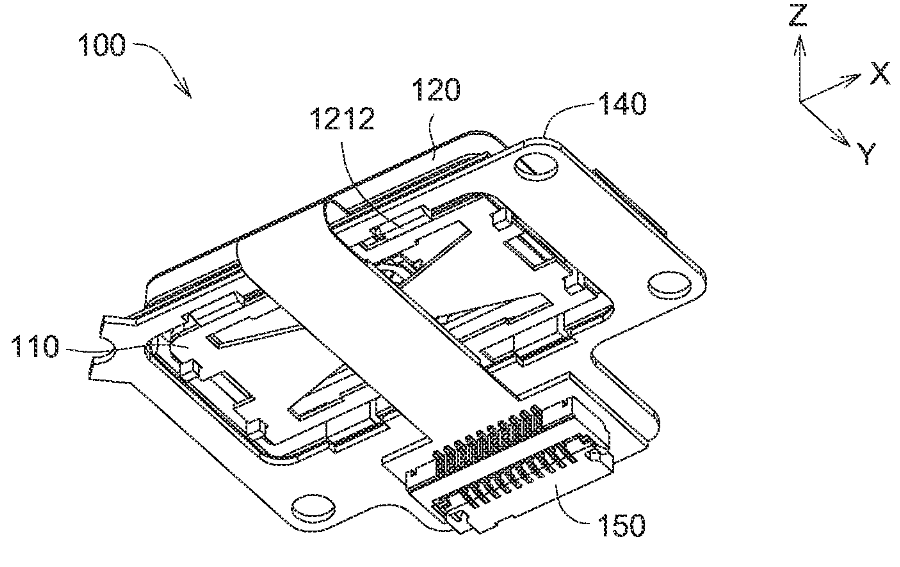
Figure 2A:
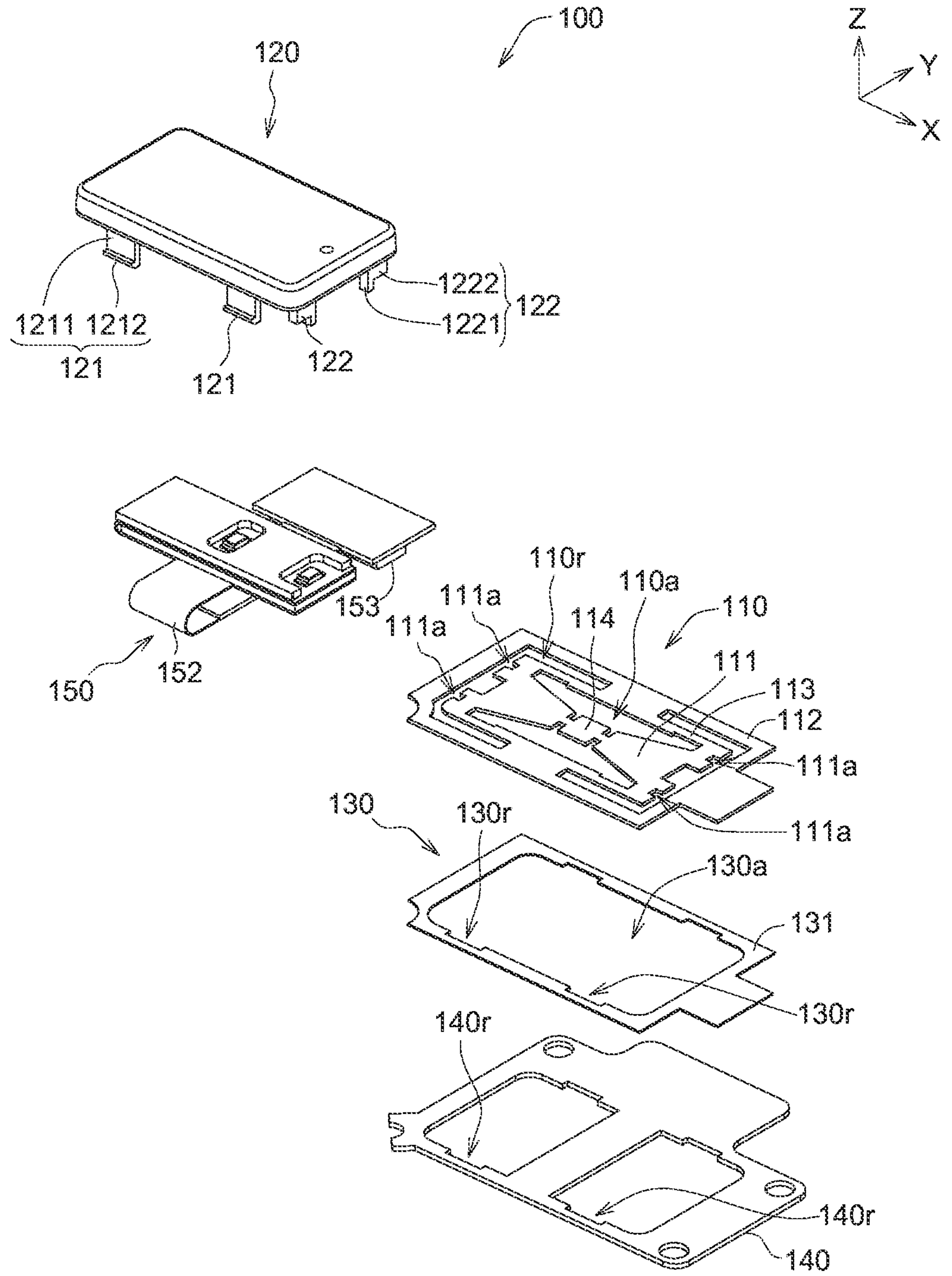
FIG. 2A shows a schematic diagram of an exploded view of the key structure in FIG. 1A.

Referring to FIGS. 1A to 3F, FIGS. 1A and 1B show schematic diagrams of combination views of a key structure 100 according to an embodiment of the present invention in different viewing angles, FIG. 2A shows a schematic diagram of an exploded view of the key structure 100 in FIG.

Figure 2B:
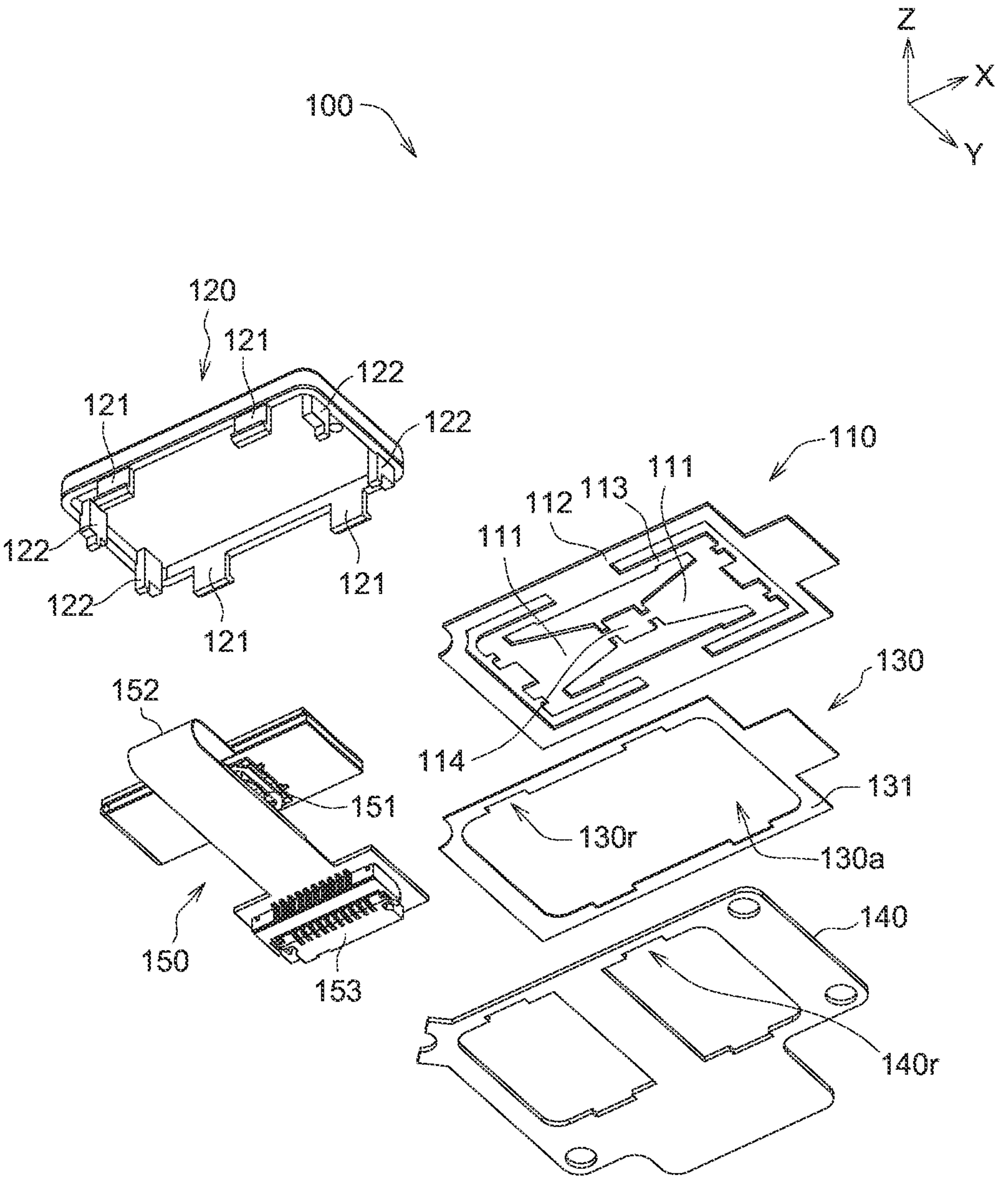
FIG. 2B shows a schematic diagram of an exploded view of the key structure in FIG. 1B.
Figure 3A:
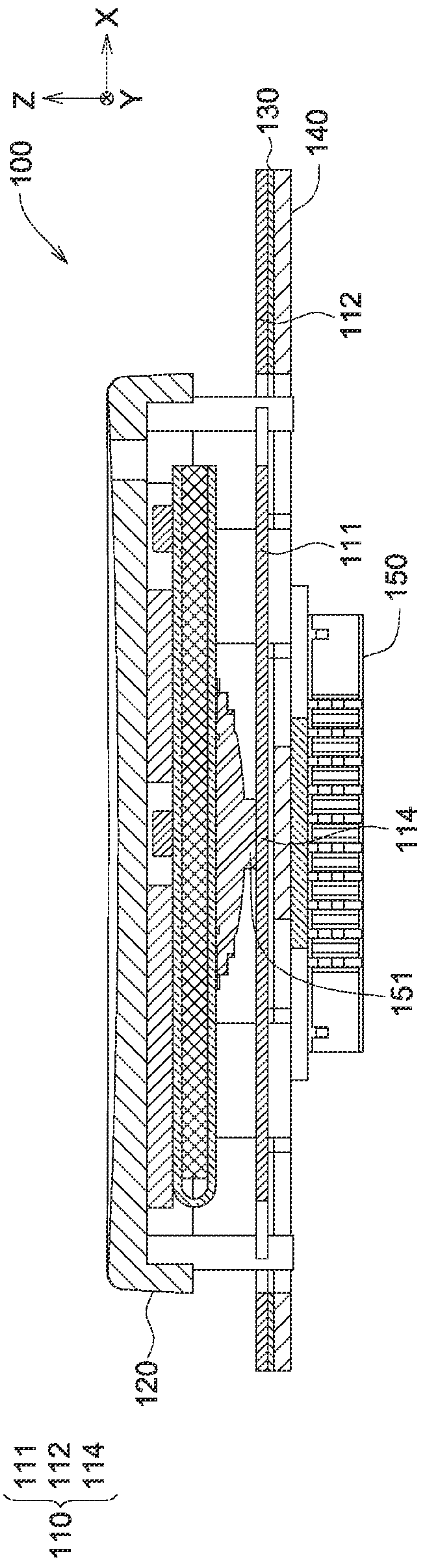
FIG. 3A shows a schematic diagram of a cross-sectional view of the key structure in FIG. 1A in a direction 3A-3A'.
Figure 3B:
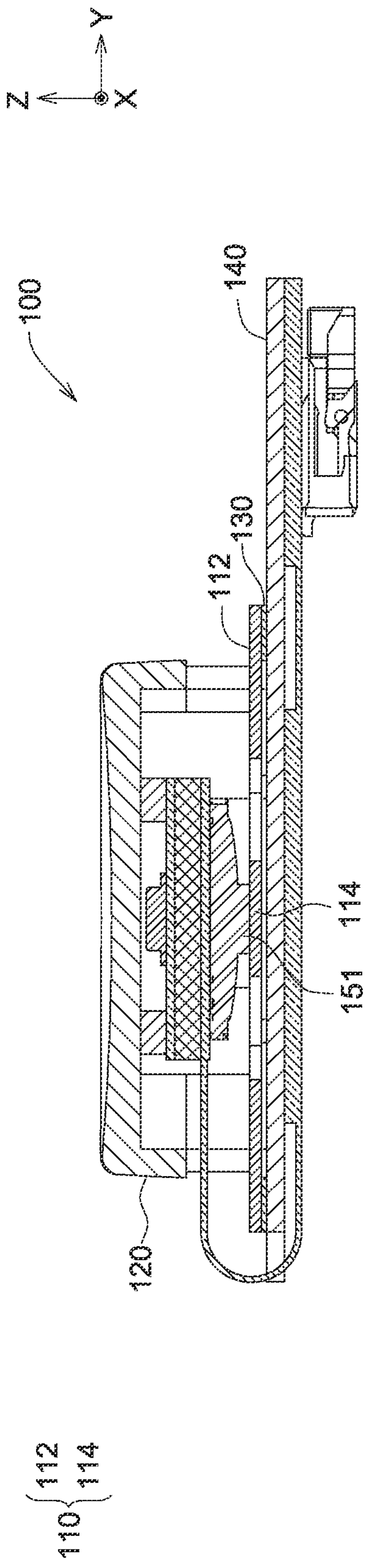
FIG. 3B shows a schematic diagram of a cross-sectional view of the key structure in FIG. 1A in a direction 3B-3B'.
Figure 3C:
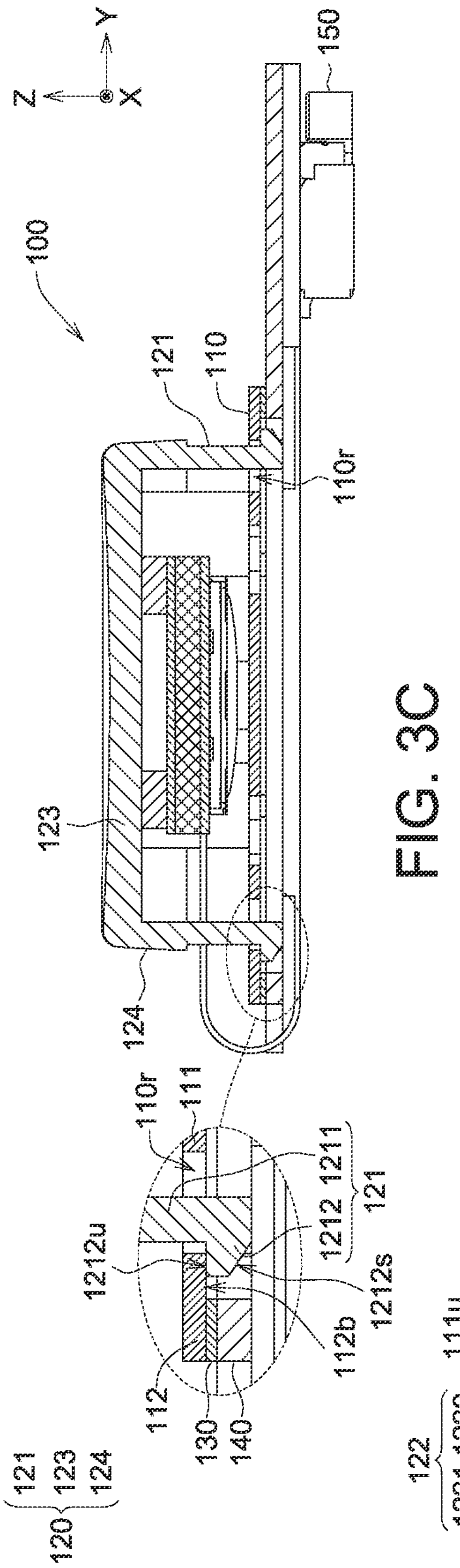
FIG. 3C shows a schematic diagram of a cross-sectional view of the key structure in FIG. 1A in a direction 3C-3C'.
Figure 3D:
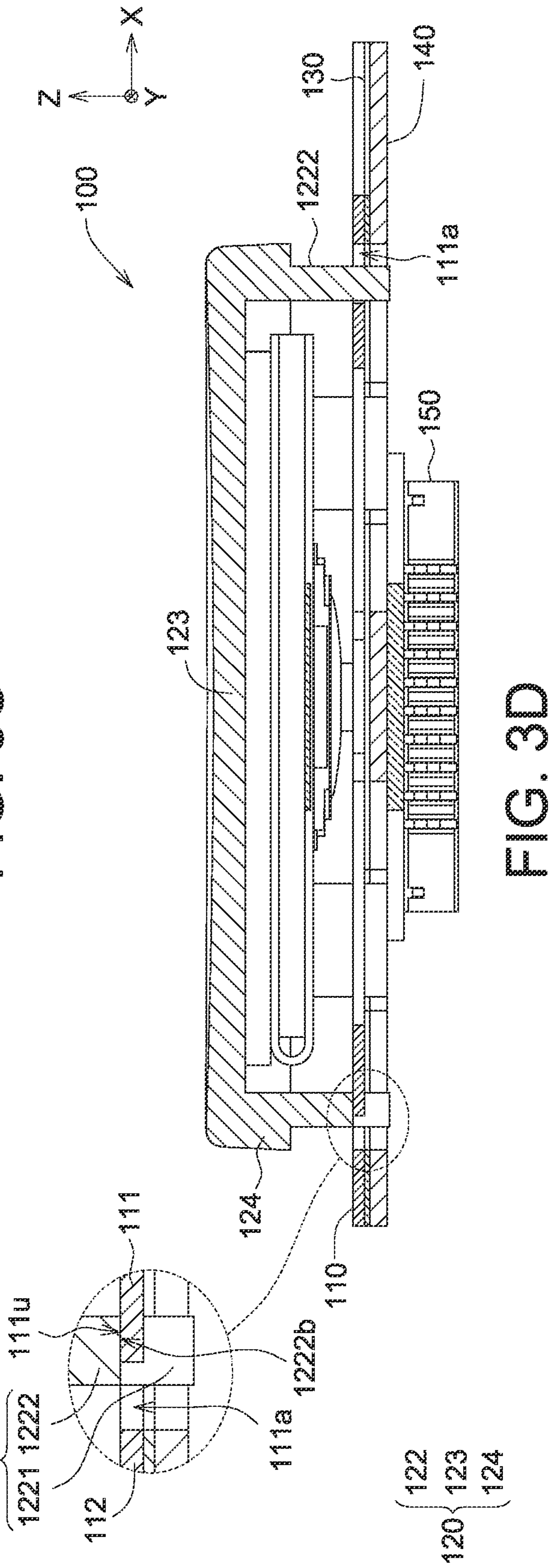
FIG. 3D shows a schematic diagram of a cross-sectional view of the key structure in FIG. 1A in a direction 3D-3D'.
Figure 3E:
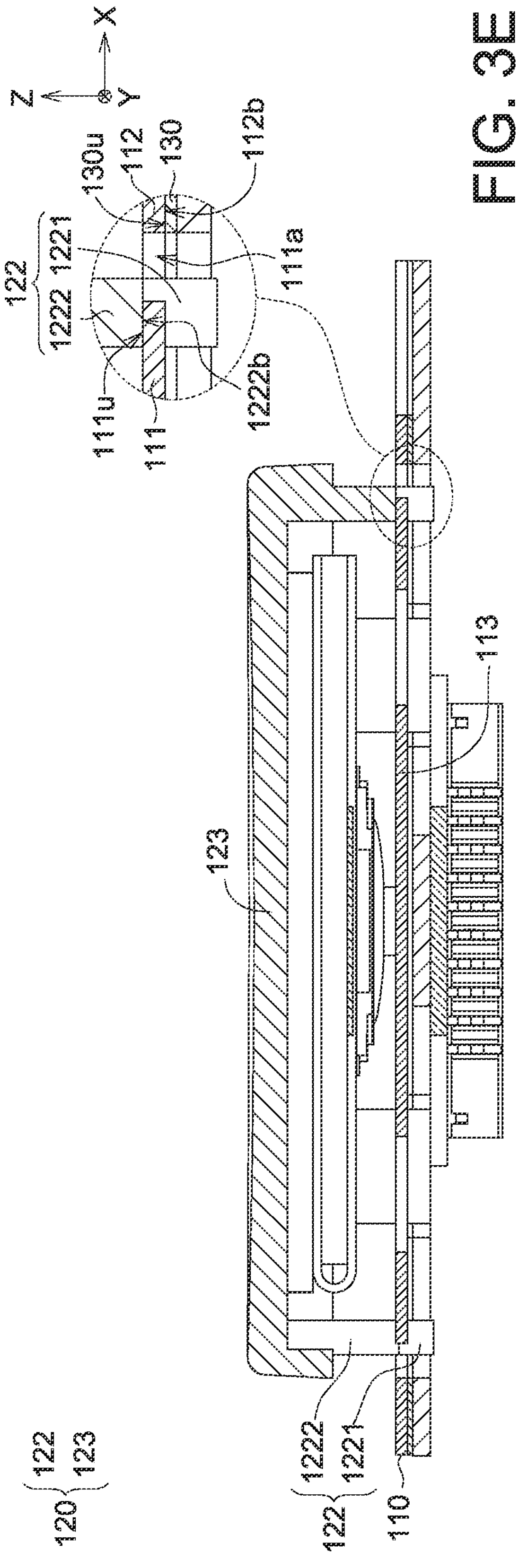
FIG. 3E shows a schematic diagram of a cross-sectional view of the key structure in FIG. 1A in a direction 3E-3E'.
Figure 3F:
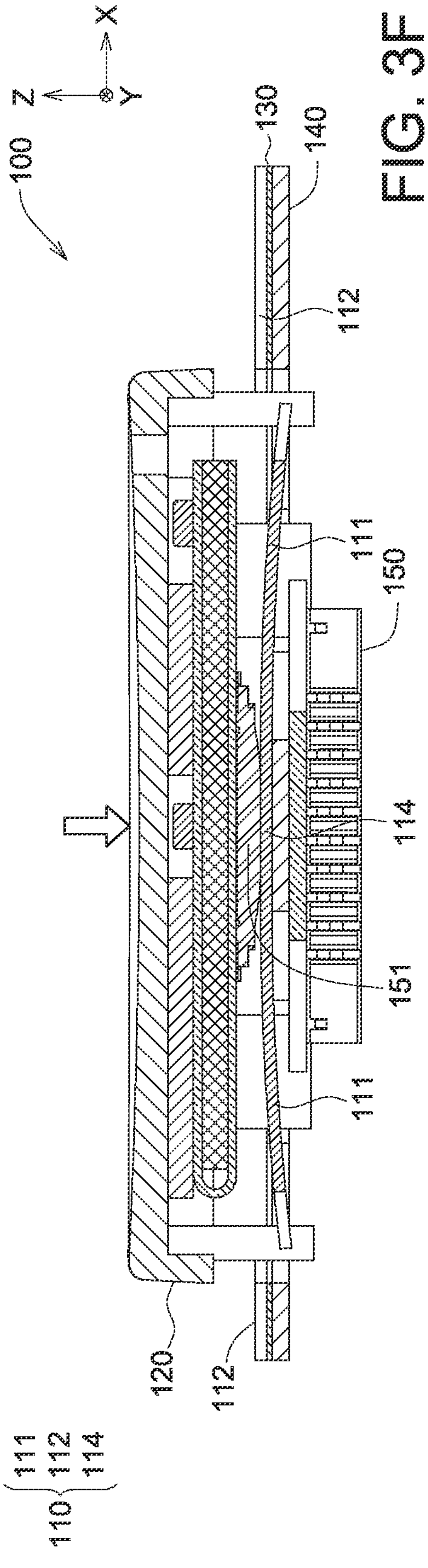
FIG. 3F shows a schematic diagram of a cross-sectional view of the key structure in FIG. 3A in a pressed state.

1A, FIG. 2B shows a schematic diagram of an exploded view of the key structure 100 in FIG. 1B, FIG. 3A shows a schematic diagram of a cross-sectional view of the key structure 100 in FIG. 1A in a direction 3A-3A', FIG. 3B shows a schematic diagram of a cross-sectional view of the key structure 100 in FIG. 1A in a direction 3B-3B', FIG. 3C shows a schematic diagram of a cross-sectional view of the key structure 100 in FIG. 1A in a direction 3C-3C', FIG. 3D shows a schematic diagram of a cross-sectional view of the key structure 100 in FIG. 1A in a direction 3D-3D', FIG. 3E shows a schematic diagram of a cross-sectional view of the key structure 100 in FIG. 1A in a direction 3E-3E', and FIG. 3F shows a schematic diagram of a cross-sectional view of the key structure 100 in FIG. 3A in a pressed state. As shown in FIG. 1A, at least one key structure 100 may be installed on an electronic device (not shown), wherein the electronic device is, for example, a keyboard, a notebook computer, a home appliance, or other electronic devices that require an input interface.

As shown in FIGS. 1A, 2A, 3C and 3D, the key structure 100 includes an elastic element 110, a keycap 120, a spacer 130, a bracket 140 and a circuit element 150. The elastic element 110 includes at least one movable portion 111, at least one fixed portion 112, at least one connection portion 113 and a triggering portion 114. The fixed portion 112 surrounds the movable portion 111. The connection portion 113 connects the fixed portion 112 with the movable portion 111. The keycap 120 includes at least a first connection portion 121 and at least a second connection portion 122. The first connection portion 121 may be connected to the fixed portion 112 of the elastic element 110. The second connection portion 122 corresponds to the movable portion 111 of the elastic element 110 in position. For example, the second connection portion 122 corresponds to (or overlaps) the movable portion 111 of the elastic element 110 in the Z-axis direction. Due to the elastic element 110 being connected to the keycap 120 and having elasticity (e.g., moves in the Z-axis), it may replace the conventional lifting mechanism.

As shown in FIG. 2A, there is a groove 110*r* between the movable portion 111 and the fixed portion 112. Such groove 110*r* may reduce the physical material between the movable portion 111 and the fixed portion 112, and increase the flexibility of the connection portion 113 with respect to the fixed portion 112. In addition, the movable portion 111 has a through hole 110*a* which may reduce the physical material of the movable portion 111 and increase the flexibility of the movable portion 111 itself. Due to the movable portion 111 and/or the connection portion 113 are flexible, the movable portion 111 and/or the connection portion 113 may also be called a flexible portion, a deformable portion or an elastic portion in the present embodiment. In an embodiment, the movable portion 111 and the fixed portion 112 may be connected only by the connection portion 113, and the remaining areas may be defined as the groove.

As shown in FIG. 2A, in an embodiment, at least two of the movable portion 111, the fixed portion 112 and the connection portion 113 is, for example, an integrally-formed sheet. Alternatively, at least two of the movable portion 111, the fixed portion 112 and the connection portion 113 may be made separately and then combined together by bonding, welding, snapping or other permanent or temporary technique. The elastic element 110 is made of metal or plastic, for example. In terms of manufacturing process, when the elastic element 110 is a metal piece (for example, stainless steel), the elastic element 110 may be an elastic piece (or elastic sheet), which may be made by, for example, sheet metal processing (for example, bending, stamping, etc.). When the elastic element 110 is a plastic part, the elastic element 110 may be made by using injection molding technology, for example. In comparison with conventional lifting mechanism (for example, scissor mechanism or butterfly mechanism), the elastic element 110 of the present embodiment of the present invention has the advantages of easier assembly, simpler structure and lower cost.

In another embodiment, the movable portion 111, the fixed portion 112 and the connection portion 113 may form an elastic unit. The elastic element 110 includes a plurality of the elastic units. The fixed portions 112 of two adjacent elastic units may be connected together. As a result, in comparison with the conventional method that requires separately assembling a plurality of the lifting mechanisms, the present embodiment of this invention may provide the elastic element capable of carrying a plurality of the keycaps 120 in one assembly process for the elastic element. In addition, the elastic element 110 including a plurality of the elastic units may be an integrally-formed sheet.

As shown in FIGS. 2A, 3C, 3D and 3F, a lower surface 112*b* of the fixed portion 112 of the elastic element 110 may be flat against an upper surface 130*u* of the spacer 130. The triggering portion 114 of the elastic element 110 is connected to the movable portion 111, and the triggering portion 114 may move with the movable portion 111. When the keycap 120 moves in the −Z axis direction, the second connection portion 122 pushes the movable portion 111 to move (or deform) in the −Z axis direction, and a switch 151 of the circuit element 150 also moves in the −Z axis direction until the switch 151 and the triggering portion 114 are mutually squeezed, causing switch 151 to be triggered, as shown in FIG. 3F. When the connection portion 113 and the movable portion 111 move in the −Z axis direction, the connection portion 113 deforms and stores elastic potential energy. When the keycap 120 is released, the connection portion 113 releases the elastic potential energy to drive the movable portion 111 and the triggering portion 114 to reset, as shown in FIG. 3A. In an embodiment, the switch 151 may include an elastic trigger body corresponding to the triggering portion 114 in position.

As shown in FIG. 3A, when the key structure 100 is in the released state, the movable portion 111, the connection portion 113 and the fixed portion 112 of the elastic element 110 may be in coplanar state. As shown in FIG. 3F, when the key structure 100 is in a pressed state, the movable portion 111 and the connection portion 113 move or deform relative to the fixed portion 112 and assume a downward concave shape.

In an embodiment, the elastic element 110 has a thickness ranging between, for example, 0.1 millimeter (mm) and 0.3 mm, for example, 0.15 mm, greater or less.

As shown in FIG. 3C, the keycap 120 further includes a top portion 123 and a peripheral portion 124. The peripheral portion 124 is connected to an edge of the top portion 123 and surrounds the top portion 123. The first connection portion 121 is connected to, for example, the peripheral portion 124 and extends in the —Z-axis direction from the peripheral portion 124. In another embodiment, the first connection portion 121 may be connected to the top portion 123 and extend from the top portion 123 toward the −Z axis. The first connection portion 121 may abut on or be engaged with a lower surface of the elastic element 110, for example, engaged with the lower surface 112*b* of the fixed portion 112. Furthermore, the first connection portion 121 includes an extension section 1211 and a connection section 1212, wherein the extension section 1211 is connected to the connection section 1212. The extension section 1211 may pass through the groove 110*r* of the elastic elements 110, so that the connection section 1212 is located on the lower surface 112*b* of the elastic element 110. The connection section 1212 is, for example, a hook, and has an upper surface 1212*u*. The upper surface 1212*u* of the connection section 1212 may abut on the lower surface 112*b* of the fixed portion 112 of the elastic element 110. In an embodiment, the upper surface 1212*u* of the connection section 1212 may always (or constantly) abut on the lower surface 112*b* of the elastic element 110, or may maintain an interval with the lower surface 112*b* (when the keycap 120 is in the released state). The lower surface 112*b* of the elastic element 110 may provide a stopping function for the first connection portion 121. For example, when the keycap 120 is in the pressed state, the connection section 1212 is separated from the fixed portion 112 in the −Z axis. When the keycap 120 changes to the released state from the pressed state, the connection portion 113 of the elastic element 110 releases the elastic potential energy to drive the connection section 1212 to move in the +Z axis direction until the upper surface 1212*u* of the connection section 1212 is blocked by the lower surface 112*b* of the elastic element 110.

As shown in FIG. 3C, the connection section 1212 of the first connection portion 121 has an inclined surface 1212*s*, wherein the inclined surface 1212*s* overlaps with the groove 110*r* in a lifting direction of the keycap 120. By the guidance of the inclined surface 1212*s*, the connection section 1212 may pass through the groove 110*r* with ease and abut on the lower surface 112*b* of the fixed portion 112.

As shown in FIGS. 3D and 3E, the second connection portion 122 is connected to, for example, the peripheral portion 124 and extends from the peripheral portion 124 in the −Z axis direction. In another embodiment, the second connection portion 122 may be connected to the top portion 123 and extend from the top portion 123 toward the −Z axis. The second connection portion 122 of the keycap 120 overlaps with the movable portion 111 in the Z-axis direction. As a result, when the keycap 120 moves in the −Z axis direction, the second connection portion 122 may push the moving portion 111 to move in the −Z axis direction. In addition, when the key structure 100 is in the released state, the second connection portion 122 of the keycap 120 abuts on the movable portion 111, that is, there is no gap between the second connection portion 122 and the movable portion 111. As a result, when the keycap 120 is pressed, the second connection portion 122 will not impact the movable portion 111 (if there is the gap, an impact noise may be generated when pressing), and thus it may avoid the impact noise and achieve the noise reduction effect.

As shown in FIGS. 3D and 3E, the second connection portion 122 of the keycap 120 includes a positioning section 1221 and an abutting section 1222, wherein the abutting section 1222 is connected to the positioning section 1221, and the positioning section 1221 protrudes with respect to the abutting section 1222 in the −Z axis. The abutting section 1222 has a lower surface 1222*b* which may be adjacent to or abut on the upper surface 111*u* of the movable portion 111. When the keycap 120 changes from the released state to the pressed state, the abutting section 1222 pushes the movable portion 111 to deform in the −Z axis direction, and at the same time, the connection portion 113 and/or the movable portion 111 stores the elastic potential energy. When the keycap 120 changes from the pressed state to the released state, the connection portion 113 releases the elastic potential energy, and the movable portion 111 push the abutting section 1222 to reset in the +Z axis direction. During the resetting process, the movable portion 111 and the abutting section 1222 may maintain contact to avoid the generation of the impact noise and achieve the noise reduction effect.

As shown in FIGS. 1A and 2A, the movable portion 111 has at least one positioning hole 111*a*, and the positioning section 1221 of the second connection portion 122 may pass through the positioning hole 111*a*. As a result, it may limit a displacement of the keycap 120 relative to the Y-axis. In addition, as shown in FIG. 2B, two second connection portions 122 are disposed oppositely in the X-axis direction. As a result, it may limit the displacement of the keycap 120 relative to the X-axis direction. In summary, it may restrain the degree of freedom of the keycap 120 relative to the elastic element 110 in the XY plane through at least two second connection portions 122. In the present embodiment, the number of the second connection portions 122 is four, but it may also be less, such as three or two, or more.

In addition, the material of the keycap 120 includes, for example, polycarbonate (PC).

As shown in FIGS. 2A and 2B, the spacer 130 is located between the bracket 140 and the elastic element 110. The spacer 130 includes an annular portion 131 and a hollow portion 130*a*. The annular portion 131 surrounds the hollow portion 130*a*. The area of the hollow portion 130*a* corresponds to (or overlaps) the movable portion 111 and the connection portion 113 of the elastic element 110 in the Z-axis direction. As a result, when the movable portion 111 and the connection portion 113 are deformed, it may avoid the interference with the physical material of the spacer 130. The fixed portion 112 of the elastic element 110 may be disposed on the spacer 130. For example, the fixed portion 112 of the elastic element 110 corresponds to (or overlaps) the annular portion 131 of the spacer 130 in the Z-axis direction. As shown in FIGS. 3A and 3C, the spacer 130 may increase the height of the elastic element 110, shorten the relative distance between the elastic element 110 and the switch 151 of the circuit element 150, and shorten a relative distance between the elastic element 110 and the keycap 120, so that the elastic element 110 connects with the first connection portion 121 and the second connection portion 122 of the keycap 120. Through the thickness design of the spacer 130, an appropriate or expected relative distance between the elastic element 110 and the switch 151 may be obtained. As a result, the triggering of the switch 151 occurs at the later of the lifting stroke of the keycap 120. In the present embodiment, the switch 151 of the circuit element 150 and the triggering portion 114 of the elastic element 110 may be in contact always or constantly. In another embodiment, when the keycap 120 is in the released state, the switch 151 maintain an interval with the triggering portion 114, wherein the interval is smaller than the lifting stroke of the keycap 120, so that the triggering of the switch 151 may occur during the keycap 120 lifting.

As shown in FIGS. 2A and 2B, the spacer 130 may have at least one notch 130*r* which allows the connection section 1212 to pass through, so that the connection section 1212 abuts on the fixed portion 112 through the notch 130*r*.

In addition, the spacer 130 may be formed of, for example, polyethylene terephthalate (PET). In an embodiment, the spacer 130 has a the thickness ranging, for example, between 0.05 millimeter (mm) and 0.30 mm, for example, 0.15 mm, greater or less.

In another embodiment, if there is no need for heightening, the spacer 130 may be omitted from the key structure 100.

As shown in FIGS. 2A, 3A and 3B, the bracket 140 is located below the spacer 130. The bracket 140 is, for example, a bottom plate (or base plate) formed of metal (e.g., stainless steel) or plastic. In the present embodiment, the bracket 140 does not have a bending portion, and the bracket 140 may be a flat plate. The bracket 140 has at least one notch 140*r* which may allow the connection section 1212 to pass through, so that the connection section 1212 abuts on the fixed portion 112 through the notch 140*r*.

In an embodiment, a relative position among the bracket 140, the spacer 130 and the fixed portion 112 of the elastic element 110 is fixed. For example, the relative position among the bracket 140, the spacer 130 and the fixed portion 112 of the elastic element 110 may be fixed through at least one housing (not shown) of the key structure 100 itself or an external housing (not shown). (For example, through bonding techniques such as hot melting, screwing, gluing, clamping or a combination thereof). Due to the fixed portion 112 being fixed relative to the housing, it may increase the operating reliability of the movable portion 111 of the elastic element 110 (if the fixed portion 112 is relatively displaceable relative to the housing, it is easy to cause unreliable or unstable operating of the movable portion 111).

As shown in FIGS. 2A and 2B, the circuit element 150 includes the aforementioned switch 151, a connection element 152 and a connector 153, wherein the connection element 152 is electrically connected to the switch 151 and the connector 153. The connection element 152 is, for example, a flexible circuit board. The connector 153 may be connected to an external circuit board. After the switch 151 is triggered, a trigger signal may be transmitted to the external circuit board through the connection element 152 and the connector 153. As shown in FIG. 3A, the switch 151 of the circuit element 150 corresponds to the triggering portion 114 in position. For example, the switch 151 corresponds to (or overlaps) the triggering portion 114 in the Z-axis direction. As a result, when the keycap 120 moves in the −Z axis direction, the switch 151 may be triggered by the triggering portion 114.

Figure 4A:
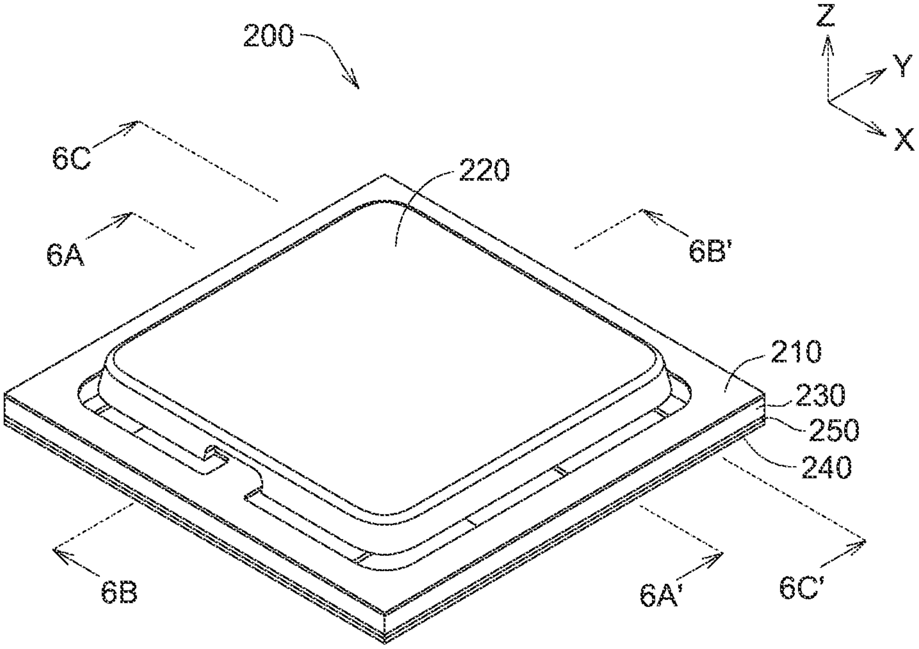
FIGS. 4A and 4B show schematic diagrams of combination views of the key structure according to another embodiment of the present invention in different viewing angles.
Figure 4B:
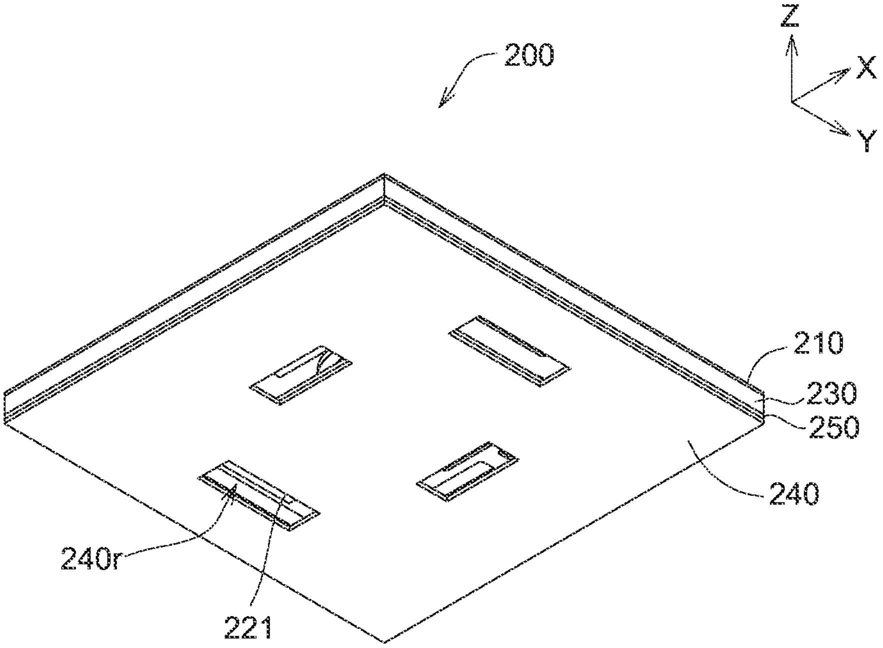
Figure 5A:
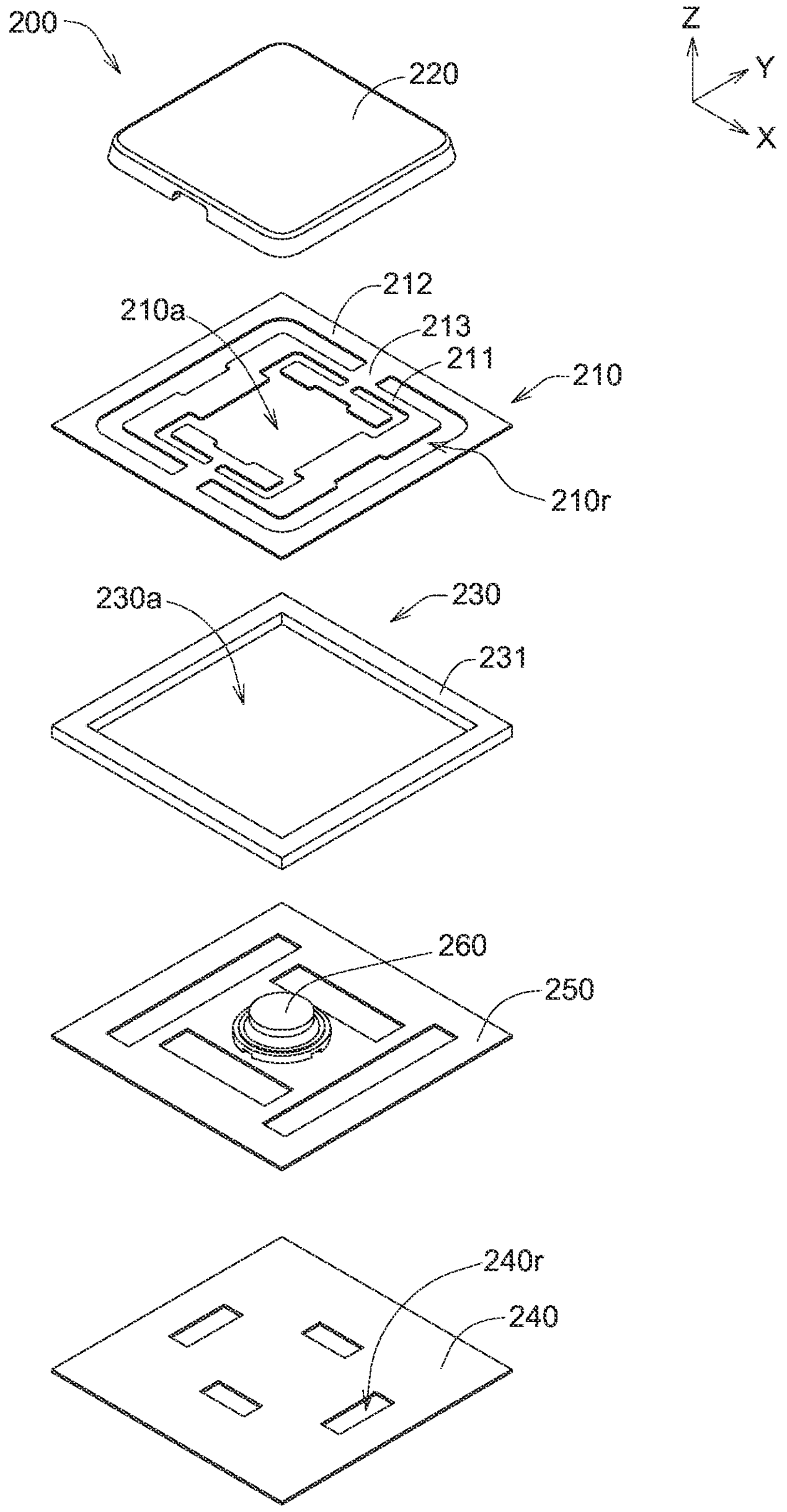
FIG. 5A shows a schematic diagram of an explosion view of the key structure in FIG. 4A.
Figure 5B:
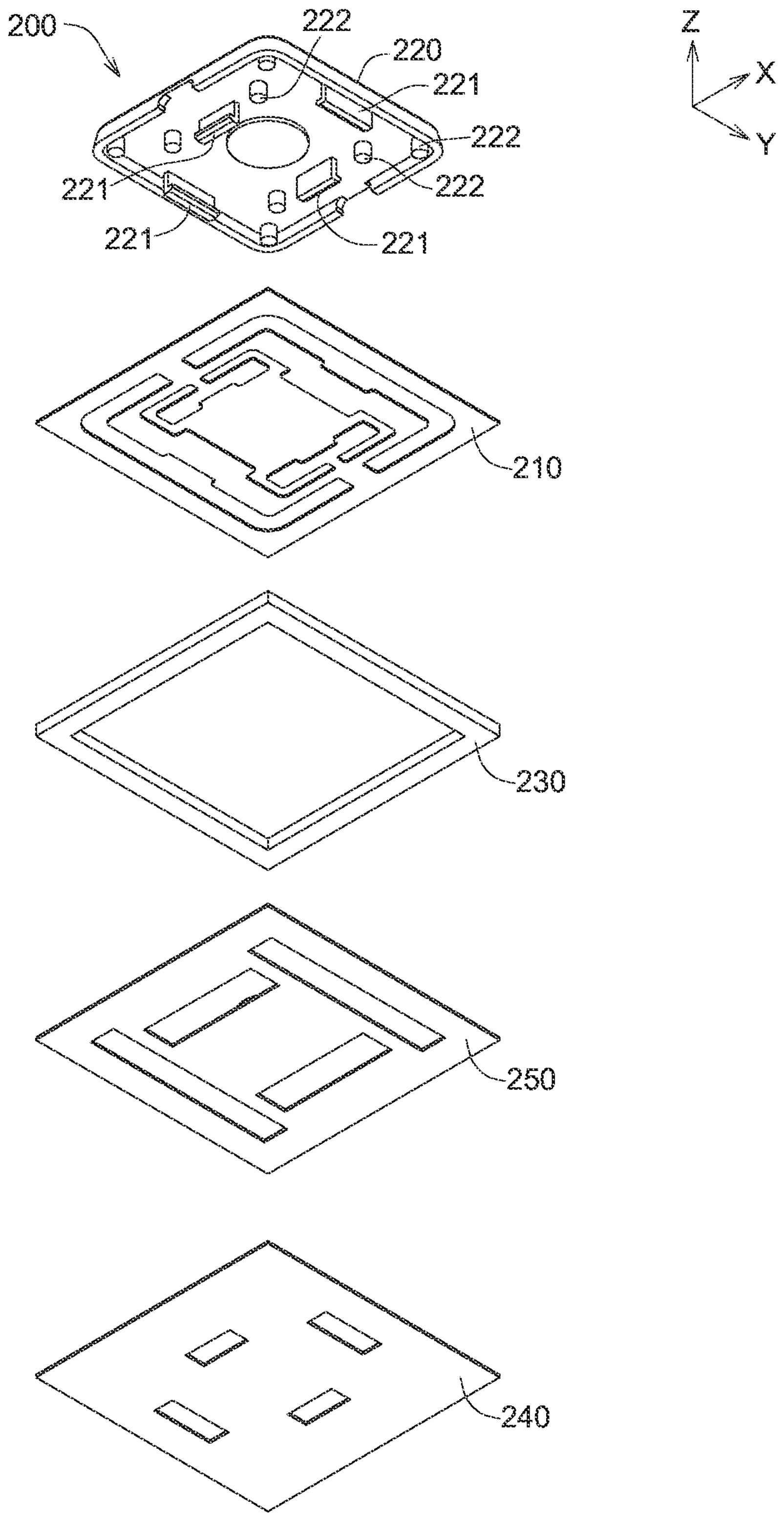
FIG. 5B shows a schematic diagram of an exploded view of the key structure in FIG. 4B.
Figure 6A:
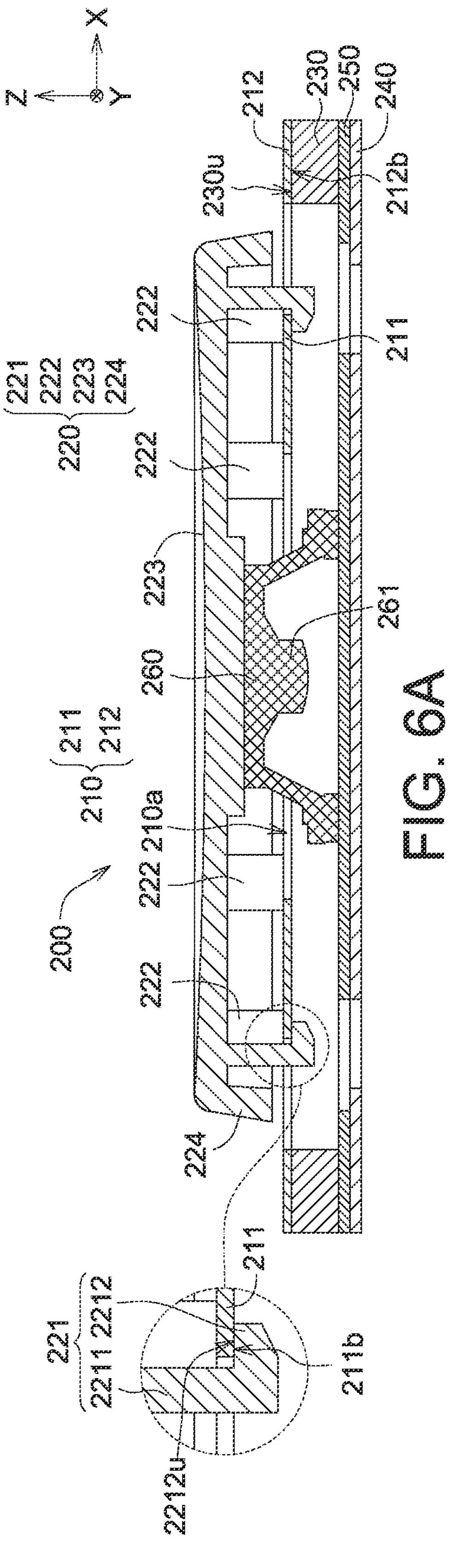
FIG. 6A shows a schematic diagram of a cross-sectional view of a key structure in FIG. 4A in a direction 6A-6A'.
Figure 6B:
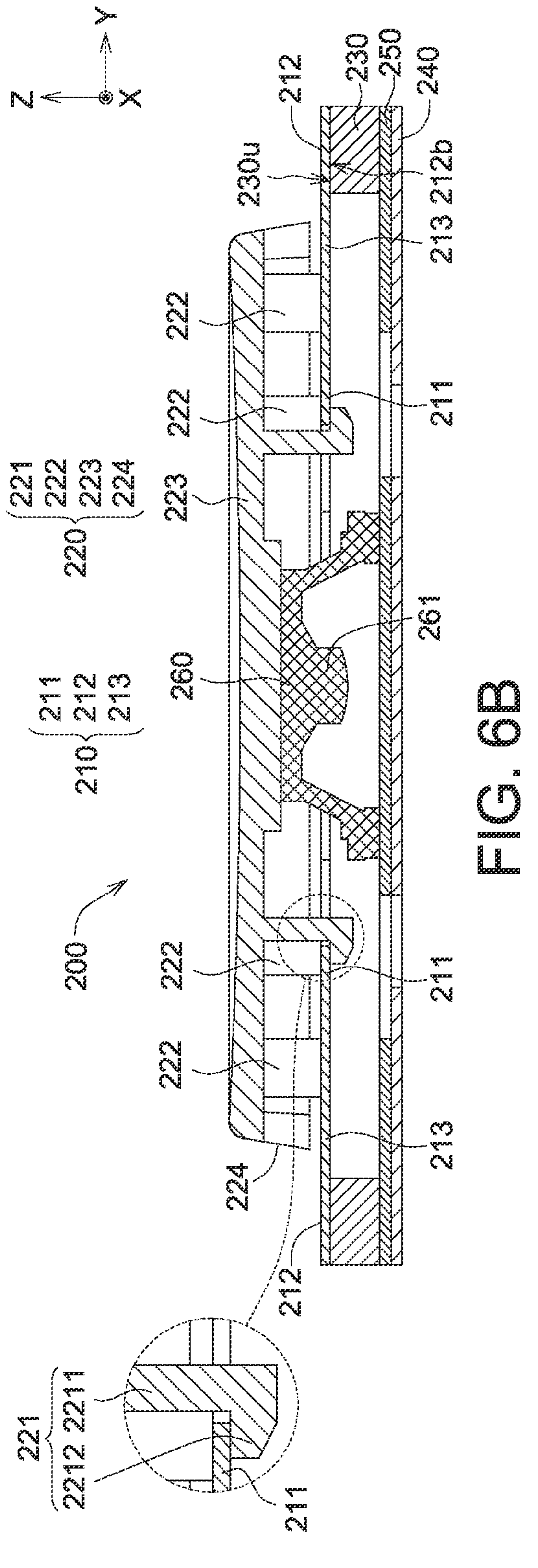
FIG. 6B shows a schematic diagram of the key structure in FIG. 4A in a direction 6B-6B'.
Figure 6C:
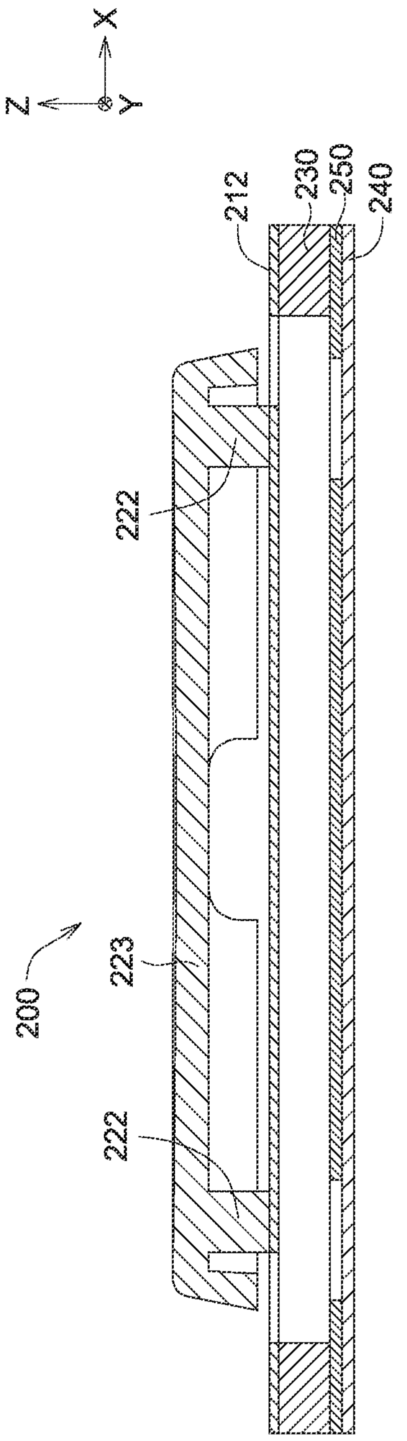
FIG. 6C shows a schematic diagram of a cross-sectional view of the key structure in FIG. 4A in a direction 6C-6C'.
Figure 6D:
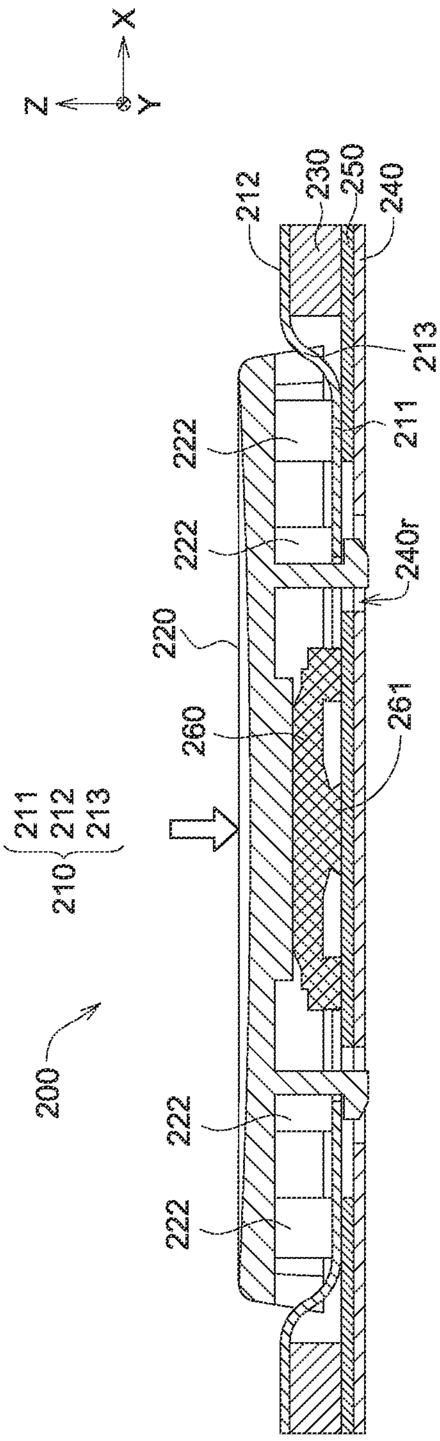
FIG. 6D shows a schematic diagram of the key structure in FIG. 6B in the pressed state.

Referring to FIGS. 4A to 6D, FIGS. 4A and 4B show schematic diagrams of combination views of the key structure 200 according to another embodiment of the present invention in different viewing angles, FIG. 5A shows a schematic diagram of an explosion view of the key structure 200 in FIG. 4A, FIG. 5B shows a schematic diagram of an exploded view of the key structure 200 in FIG. 4B, FIG. 6A shows a schematic diagram of a cross-sectional view of a key structure 200 in FIG. 4A in a direction 6A-6A', FIG. 6B shows a schematic diagram of the key structure 200 in FIG. 4A in a direction 6B-6B', FIG. 6C shows a schematic diagram of a cross-sectional view of the key structure 200 in FIG. 4A in a direction 6C-6C', and FIG. 6D shows a schematic diagram of the key structure 200 in FIG. 6B in the pressed state.

As shown in FIGS. 4A, 5A and 5B, the key structure 200 includes an elastic element 210, a keycap 220, a spacer 230, a bracket 240, a circuit element 250 and a trigger body 260. The elastic element 210 includes at least one movable portion 211, at least one fixed portion 212 and at least one connection portion 213. The fixed portion 212 surrounds the movable portion 211, and the connection portion 213 connects the fixed portion 212 with the movable portion 211. The keycap 220 at least includes a first connection portion 221 and at least a second connection portion 222. The first connection portion 221 may be connected to the fixed portion 212 of the elastic element 210. The second connection portion 222 corresponds to the movable portion 211 of the elastic element 210 in position. For example, the second connection portion 222 corresponds to (or overlaps) the movable portion 211 of the elastic element 210 in the Z-axis direction. Due to the elastic element 210 being connected to the keycap 220 and having elasticity (e.g., moves in the Z-axis direction), it may replace the conventional lifting mechanism.

As shown in FIGS. 5A and 6A, the elastic element 210 has a through hole 210*a*, and the trigger body 260 may be disposed through the through hole 210*a* to avoid interference between the trigger body 260 and the physical material of the elastic element 210. In addition, the perforations 210*a* may also reduce the solid material of the movable portion 211 and increase the flexibility of the movable portion 211 itself.

As shown in FIG. 5A, there is a groove 210*r* between the movable portion 211 and the fixed portion 212. The groove 210*r* may reduce the physical material between the movable portion 211 and the fixed portion 212, and accordingly it increases the flexibility between the movable portion 111 and the fixed portion 212. In an embodiment, the movable portion 211 and the fixed portion 212 may be connected only by the connection portion 213, and the remaining areas may be defined as the groove.

As shown in FIGS. 5A and 5B, in an embodiment, at least two of the movable portion 211, the fixed portion 212 and the connection portion 213 are, for example, integrally-formed sheets, or are made separately and then combined together by bonding, welding, snapping or other permanent or temporary technique. The elastic element 210 is made of metal or plastic, for example. In terms of manufacturing process, when the elastic element 210 is a metal piece, the elastic element 210 may be an elastic piece, which may be made by, for example, sheet metal processing (for example, bending, stamping, etc.). When the elastic element 210 is a plastic part, the elastic element 210 may be made by using injection molding technology, for example. In comparison with conventional lifting mechanism (for example, scissor mechanism or butterfly mechanism), the elastic element 210 of the present embodiment of the present invention has the advantages of easier assembly, simpler structure and lower cost.

In another embodiment, the movable portion 211, the fixed portion 212 and the connection portion 213 may form an elastic unit. The elastic element 210 includes a plurality of the elastic units. The fixed portions 212 of two adjacent elastic units may be connected together. As a result, in comparison with the conventional method that requires separately assembling a plurality of the lifting mechanisms, the present embodiment of this invention may provide the elastic element capable of carrying a plurality of the keycaps 220 in one assembly process for the elastic element. In addition, the elastic element 210 including a plurality of the elastic units may be an integrally-formed sheet.

As shown in FIG. 5A, when the key structure 200 is in the released state, the movable portion 211, the connection portion 213 and the fixed portion 212 of the elastic element 210 may be coplanar state. As shown in FIG. 6D, due to the key structure 200 being in the pressed state, the movable portion 211 and the connection portion 213 may move or deform relative to the fixed portion 212 to a downward concave shape.

As shown in FIGS. 6A and 6B, a lower surface 212*b* of the fixed portion 212 of the elastic element 210 may be flat against an upper surface 230*u* of the spacer 230. Due to the connection portion 213 having flexibility, the movable portion 211 may move in the −Z-axis direction after the connection portion 213 is deformed. The connection portion 213 itself may also have flexibility. As a result, when the connection portion 213 moves in the −Z-axis direction, the connection portion 213 deforms and stores the elastic potential energy. When the keycap 220 is released, the connection portion 213 releases the elastic potential energy to drive the movable portion 211 to reset.

In an embodiment, the elastic element 210 has a thickness ranging between, for example, 0.1 mm and 0.3 mm, for example, 0.15 mm, greater or less.

As shown in FIGS. 6A and 6B, the keycap 220 further includes a top portion 223 and a peripheral portion 224. The peripheral portion 224 is connected to the edge of the top portion 223 and surrounds the top portion 223. The first connection portion 221 is connected to, for example, the top portion 223 and extends from the top portion 223 in the −Z-axis direction. In another embodiment, the first connection portion 221 may be connected to the peripheral portion 224 and extend from the peripheral portion 224 in the −Z-axis direction. Furthermore, the first connection portion 221 includes an extension section 2211 and a connection section 2212, wherein the extension section 2211 is connected to the connection section 2212. The extension section 2211 may pass through the groove 210*r* of the elastic elements 210, so that the connection section 2212 is located on a lower surface 211*b* of the elastic element 210. The connection section 2212 has an upper surface 2212*u*, and the upper surface 2212*u* of the connection section 2212 abuts on the lower surface 211*b* of the movable portion 211 of the elastic element 210. In an embodiment, the upper surface 2212*u* of the connection section 2212 may always (or constantly) abut on the lower surface 211*b* of the elastic element 210, or may also maintain an interval with the lower surface 211*b* (when the keycap 220 is in the released state).

As described above, it may be seen that the first connection portion of the keycap according to the embodiment of the present invention may be connected (fastening, pressing, abutting, etc.) to the fixed portion or the movable portion of the elastic element.

As shown in FIGS. 6A and 6B, the second connection portion 222 of the keycap 220 is connected to, for example, the top portion 223 and extends from the top portion 223 in the −Z axis direction. In another embodiment, the first connection portion 221 may be connected to the peripheral portion 224 and extend from the peripheral portion 224 in the −Z-axis direction. The second connection portion 222 overlaps with the movable portion 211 in the Z-axis direction. As a result, when the keycap 220 moves in the −Z direction, the second connection portion 222 may push the movable portion 211 to move in the −Z axis direction. When the key structure 200 is in the released state, the second connection portion 222 of the keycap 220 abuts on the movable portion 211, that is, there is no gap between the second connection portion 222 and the movable portion 211. As a result, when the keycap 220 is pressed, the second connection portion 222 will not impact the movable portion 211 (if there is the gap, an impact noise may be generated when pressing), and thus it may avoid the impact noise and achieve the noise reduction effect.

As shown in FIGS. 6A and 6B, the second connection portion 222 and the first connection portion 221 of the keycap 220 are respectively located at or in contact with two sides of the elastic element 210. When the keycap 220 changes between the released state and the pressed state, the second connection portion 222 and the first connection portion 221 constrain (or clamp) the elastic element 210 to prevent the movable portion 211 of the elastic element 210 from excessive axial oscillation in the +/−Z direction.

As shown in FIGS. 5A, 6A to 6B, the spacer 230 and the circuit element 250 may be located between the bracket 240 and the elastic element 210. The spacer 230 includes an annular portion 231 and a hollow portion 230*a*. The annular portion 231 surrounds the hollow portion 230*a*. The area of the hollow portion 230*a* corresponds to (or overlaps) the movable portion 211 and the connection portion 213 of the elastic element 210 in the Z-axis direction. As a result, when the movable portion 211 and the connection portion 213 are deformed, it may avoid the interference with the physical material of the spacer 230. The fixed portion 212 of the elastic element 210 is disposed on the spacer 230. For example, the fixed portion 212 of the elastic element 210 corresponds to (or overlaps) the annular portion 231 of the spacer 230 in the Z-axis direction. As shown in FIG. 6A, the spacer 230 may increase the height of the elastic element 210, and shorten a relative distance between the elastic element 210 and the keycap 220, so that the elastic element 210 connects with the first connection portion 221 and the second connection portion 222 of the keycap 220. In another embodiment, if there is no need for heightening, the spacer 230 may be omitted from the key structure 200.

As shown in FIGS. 4B and 6A, the bracket 240 is located below the spacer 230. The bracket 240 is formed of metal or plastic, for example. In the present embodiment, the bracket 240 does not have a bending part, and the bracket 240 may be a flat plate. The bracket 140 has at least one notch 240*r* which may allow the connection section 2212 to pass through. Furthermore, as shown in FIG. 6D, when the keycap 220 is in the pressed state, the notch 240*r* may accommodate the connection section 2212 to avoid the interference between the connection section 2212 and the physical material of the bracket 240.

As shown in FIGS. 5A and 6A, the circuit element 250 could be a circuit layer, such as a membrane switch layer or a printed circuit board. In another embodiment, the circuit device 250 may include at least one switch. After the switch of the circuit element 250 is triggered, a trigger signal may be transmitted to an external circuit board through the wires of the circuit element 250.

In an embodiment, a relative position among the bracket 240, the spacer 230, the fixed portion 212 of the elastic element 210 and the circuit element 250 is fixed. For example, the relative position among the bracket 240, the spacer 230, the fixed portion 212 of the elastic element 210 and the circuit element 250 may be fixed (for example, through bonding techniques such as hot melting, screwing, gluing, clamping or a combination thereof) through at least one housing (not shown) of the key structure 200 itself or an external housing (not shown). Due to the fixed portion 212 being fixed relative to the housing, it may increase the operating reliability of the movable portion 211 of the elastic element 210 (if the fixed portion 212 is relatively displaceable relative to the housing, it is easy to cause unreliable or unstable operating of the movable portion 211).

As shown in FIGS. 6A to 6D, the trigger body 260 is located between the circuit element 250 and the keycap 220. The trigger body 260 is, for example, an elastic body. When the key structure 200 is in the released state (for example, as shown in FIGS. 6A to 6C), the trigger body 260 may be in a free state. When the key structure 200 is in the pressed state (for example, as shown in FIG. 6D), the trigger body 260 deforms to store the elastic potential energy. After the key structure 200 is released, the trigger body 260 releases the elastic potential energy to drive the keycap 220 to reset. The trigger body 260 may include a triggering portion 261 facing a switch (not shown) of the circuit element 250. When the key structure 200 is in the pressed state, the trigger body 260 deforms, so that the triggering portion 261 triggers the switch of the circuit element 250 downward. In terms of material, the trigger body 260 is formed of, for example, rubber.

Figure 7A:
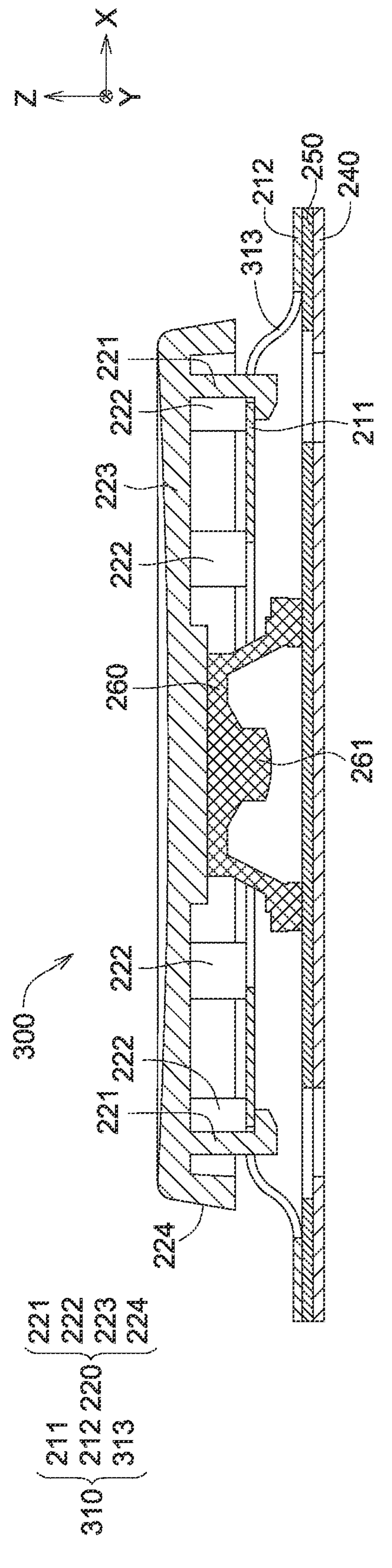
FIG. 7A shows a schematic diagram of a cross-sectional view of a key structure in the released state according to another embodiment of the present invention.
Figure 7B:
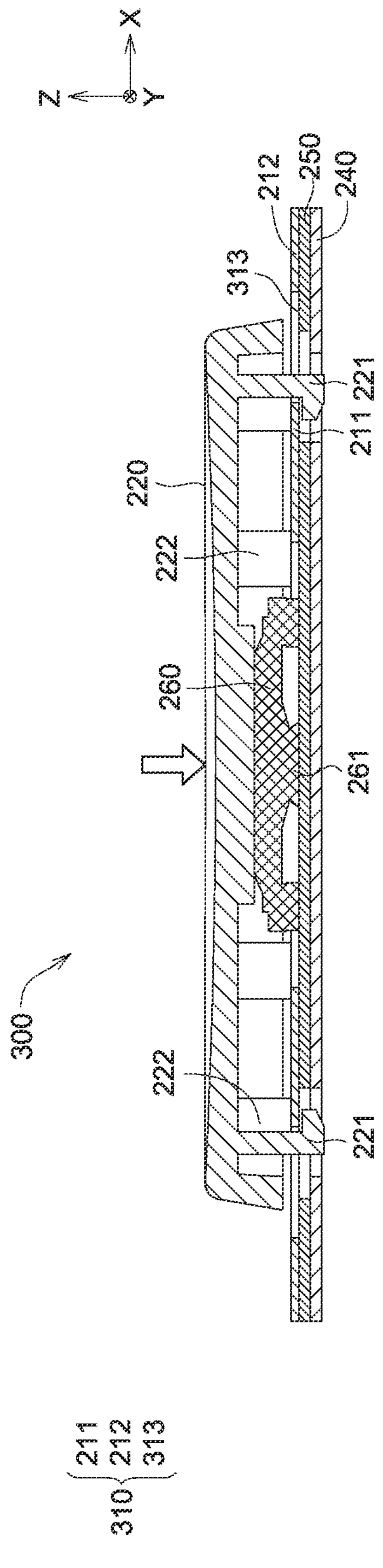
FIG. 7B shows a schematic diagram of a cross-sectional view of the key structure 300 in FIG. 7A in the pressed state.

Referring to FIGS. 7A to 7B, FIG. 7A shows a schematic diagram of a cross-sectional view of a key structure 300 in the released state according to another embodiment of the present invention, and FIG. 7B shows a schematic diagram of a cross-sectional view of the key structure 300 in FIG. 7A in the pressed state. At least one key structure 300 may be installed on an electronic device (not shown), wherein the electronic device is, for example, a keyboard, a laptop, a home appliance, or other electronic devices that require an input interface.

As shown in FIGS. 7A to 7B, the key structure 300 includes an elastic element 310, a keycap 220, a bracket 240, a circuit element 250 and a trigger body 260. The elastic element 310 includes at least one movable portion 211, at least one fixed portion 212 and at least one connection portion 313. The fixed portion 212 surrounds the movable portion 211, and the connection portion 313 connects the fixed portion 212 with the movable portion 211. The keycap 220 includes at least one first connection portion 221 and at least one second connection portion 222. The first connection portion 221 may be connected to the fixed portion 212 of the elastic element 210. The second connection portion 222 corresponds to the movable portion 211 of the elastic element 210 in position. For example, the second connection portion 222 corresponds to (or overlaps) the movable portion 211 of the elastic element 310 in the Z-axis direction. Due to the elastic element 310 being connected to the keycap 220 and having elasticity (for example, moves in the Z-axis direction), it may replace the conventional lifting mechanism.

The key structure 300 includes technical features the same as or similar to that of the aforementioned key structure 200. The key structure 300 is different from the key structure 200 is that the elastic element 310 of the key structure 300 and the elastic element 210 of the key structure 200 are different in structure. For example, when the elastic element 310 is in the free state (as shown in FIG. 7A), its connection portion 313 is in curved-shape. As shown in FIG. 7A, when the key structure 300 is in the released state, the elastic element 310 is in the free state and assumes a downward concave shape. During the process of the key structure 300 changing from the released state to the pressed state (as shown in FIG. 7B), the movable portion 211 of the elastic element 310 is pushed downward by the second connection portion 222 of the keycap 220, causing the connection portion 313 of the elastic element 310 to deforms, and finally the elastic element 310 assumes a substantially coplanar shape, as shown in FIG. 7B. When the key structure 300 is released, the connection portion 213 releases the elastic potential energy to drive the movable portion 211 to reset, as shown in FIG. 7A.

Figure 8A:
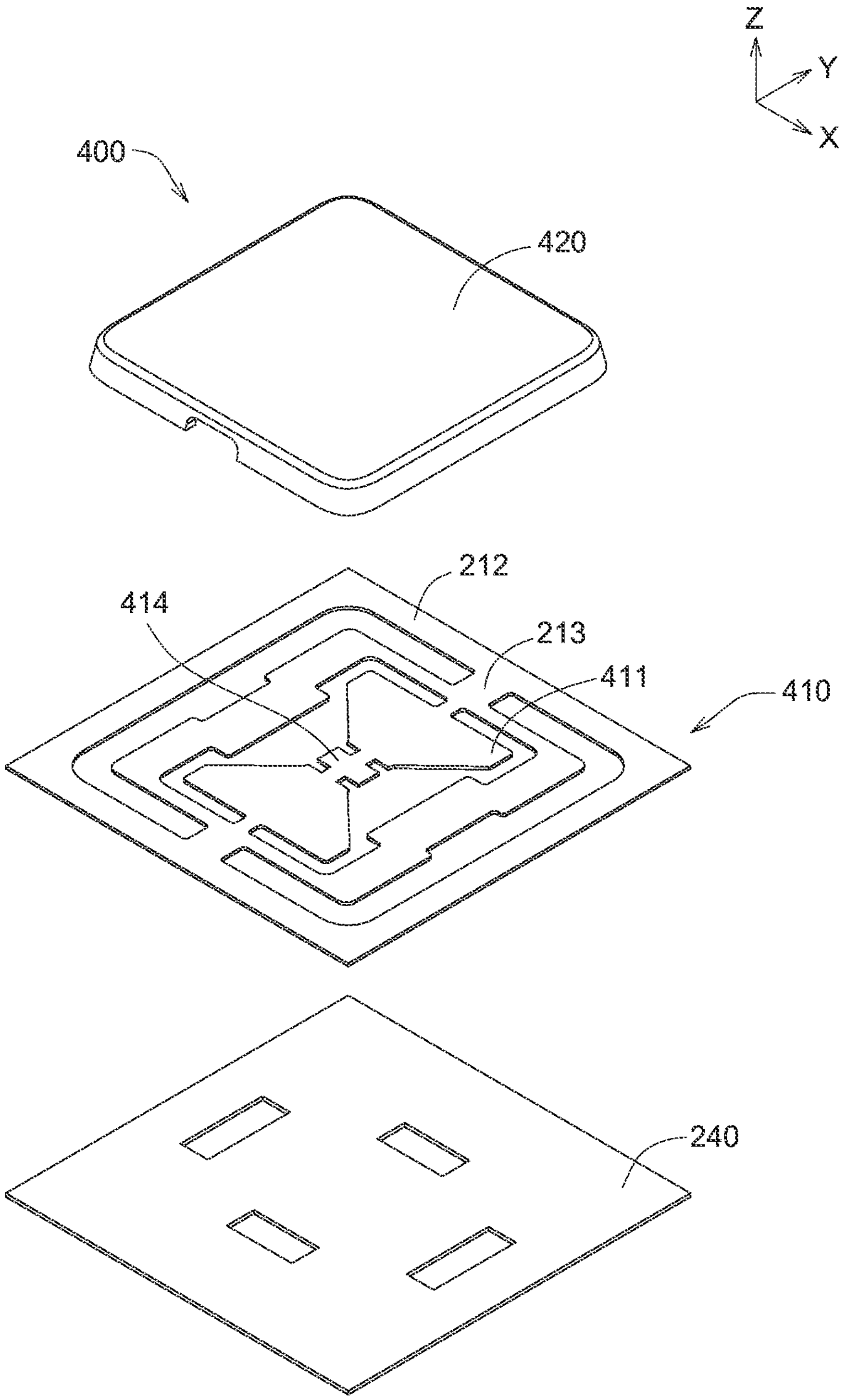
FIG. 8A shows a schematic diagram of an exploded view of a key structure according to another embodiment of the present invention.
Figure 8B:
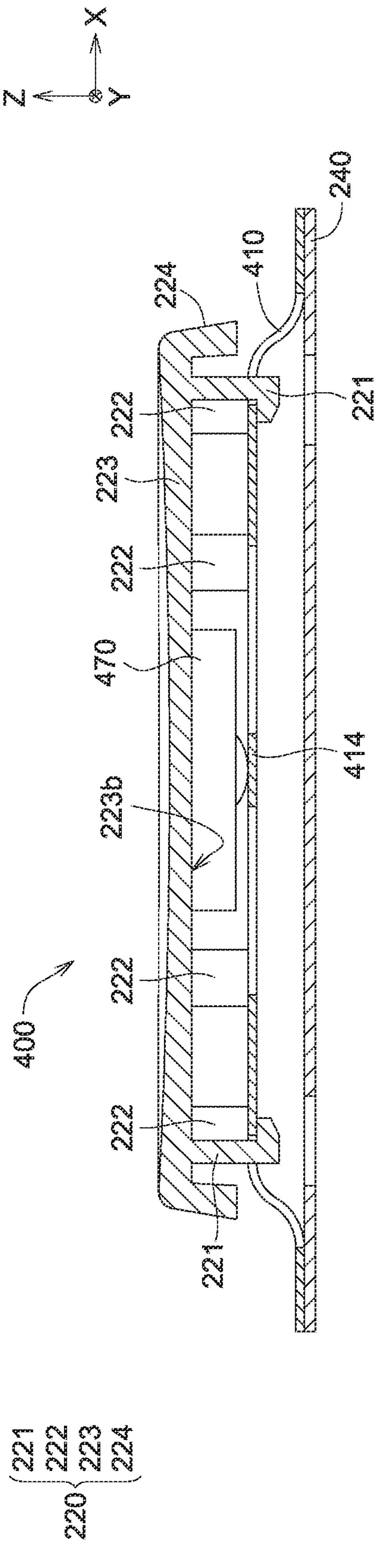
FIG. 8B shows a schematic diagram of a cross-sectional view of the key structure in FIG. 8A in the released state after assembly.
Figure 8C:
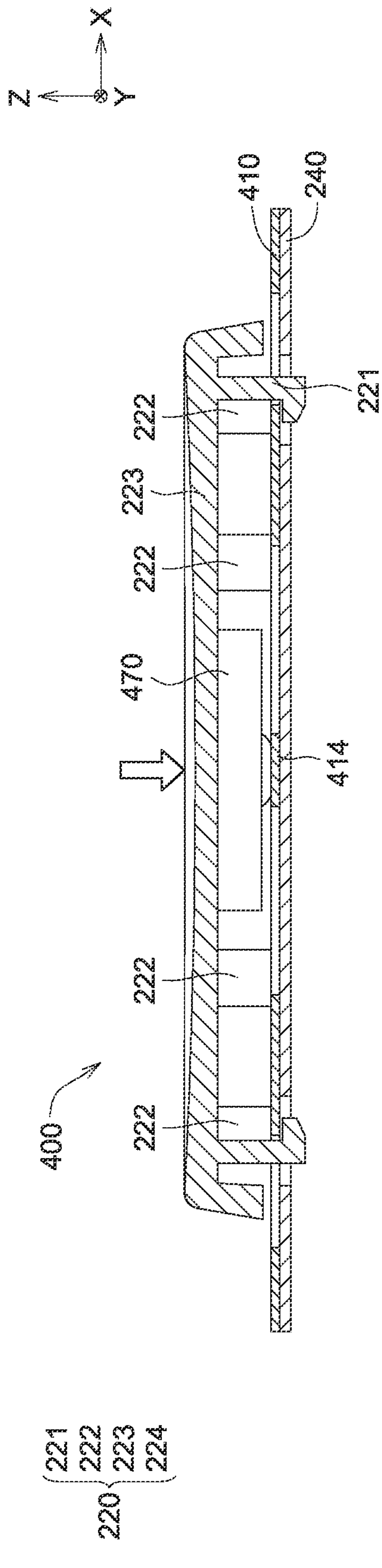
FIG. 8C shows a schematic diagram of a cross-sectional view of the key structure in FIG. 8B in the pressed state.

Referring to FIGS. 8A to 8C, FIG. 8A shows a schematic diagram of an exploded view of a key structure 400 according to another embodiment of the present invention, FIG. 8B shows a schematic diagram of a cross-sectional view of the key structure 400 in FIG. 8A in the released state after assembly, and FIG. 8C shows a schematic diagram of a cross-sectional view of the key structure 400 in FIG. 8B in the pressed state. At least one key structure 400 may be installed on an electronic device (not shown), wherein the electronic device is, for example, a keyboard, a laptop, a home appliance, or other electronic devices that require an input interface.

As shown in FIGS. 8A to 8C, the key structure 400 includes an elastic element 410, a keycap 220, a bracket 240 and a switch 470. The key structure 400 includes technical features the same as or similar as that of the aforementioned key structure 300. The key structure 400 is different from the key structure 300 is that the elastic element 410 of the key structure 400 and the elastic element 310 are different in structure, and the key structure 400 further includes a switch 470 which may be triggered by the elastic element 410, and the key structure 400 may omit the circuit element 250. In an embodiment, the switch 470 may be the circuit element 150 or a part (for example, the switch 151) of the circuit element 150 in the previous embodiments (as shown in FIGS. 1A to 3F), and the switch 470 may be optionally disposed on a corresponding trigger circuit board.

As shown in FIG. 8A, the elastic element 410 includes at least one movable portion 411, at least one fixed portion 212, at least one connection portion 213 and a triggering portion 414. The fixed portion 212 surrounds the movable portion 211, and the connection portion 213 connects the fixed portion 212 with the movable portion 411. The triggering portion 414 is connected to the movable portion 411 so as to move with the movable portion 411.

In another embodiment, the key structure 400 may further include the spacer 230 which is disposed between the elastic element 410 and the bracket 240 to increase the height of the elastic element 410.

The elastic element 410 and the elastic element 210 of the key structure 200 are different in structure. Furthermore, as shown in FIG. 8B, when the key structure 400 is in the released state, the elastic element 410 is in the free state and assumes a downward concave shape. During the process of the key structure 400 changing from the released state to the pressed state, the movable portion 411 of the elastic element 410 is pushed downward by the second connection portion 222 of the keycap 220, causing the movable portion 411 of the elastic element 410 to deform, and finally the elastic element 410 assumes a substantially coplanar shape, as shown in FIG. 8C. When the key structure 400 is released, the connection portion 213 releases the elastic potential energy to drive the movable portion 411 to reset, as shown in FIG. 8B.

As shown in FIG. 8B, the switch 470 may be disposed on a bottom surface of the keycap 220. For example, the switch 470 is disposed on a bottom surface 223*b* of the top portion 223 of the keycap 220. In another embodiment, the key structure 400 further includes a circuit board which is disposed on the bottom surface 223*b* of the top portion 223, and the switch 470 is disposed on and electrically connected to the circuit board. The circuit board disposed on the keycap 220 may be electrically connected to an external circuit board. When the switch 470 is triggered, a trigger signal may be transmitted to the external circuit board through the circuit board disposed on the keycap 220. As shown in FIG. 8C, when the keycap 220 is in the pressed state, the triggering portion 414 of the elastic element 410 interferes with the switch 470 to trigger the switch 470.

Figure 9A:
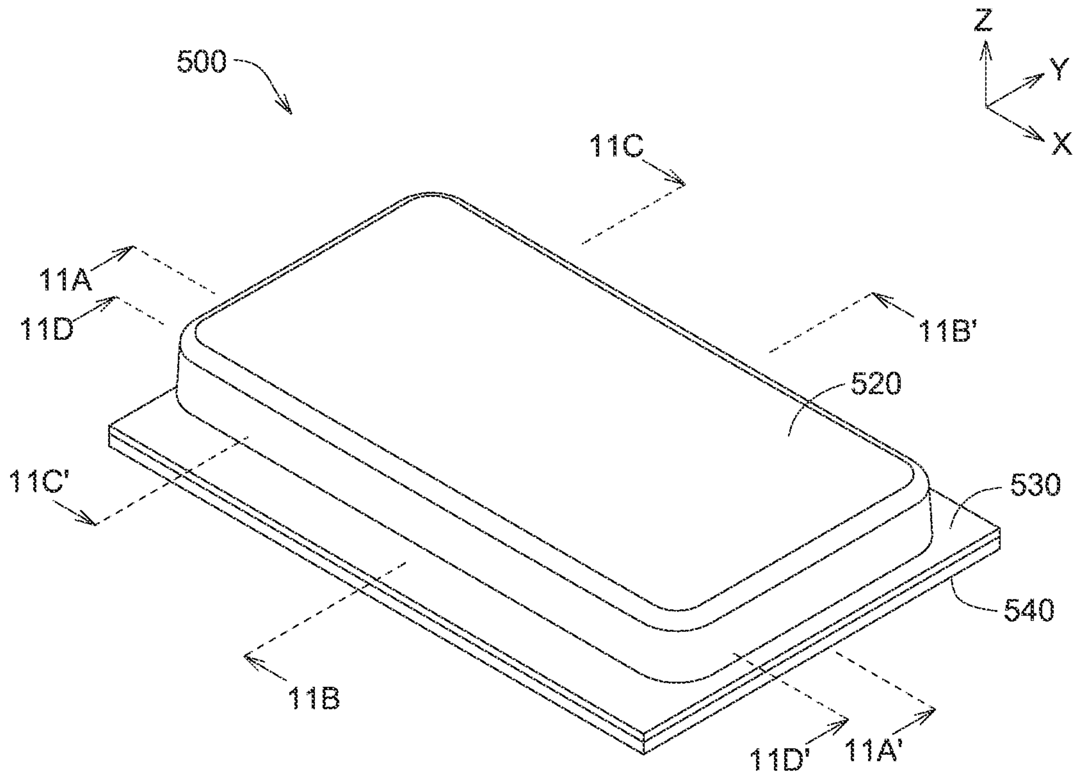
FIGS. 9A and 9B show schematic diagrams of combination views of a key structure 500 according to another embodiment of the present invention in different viewing angles.
Figure 9B:
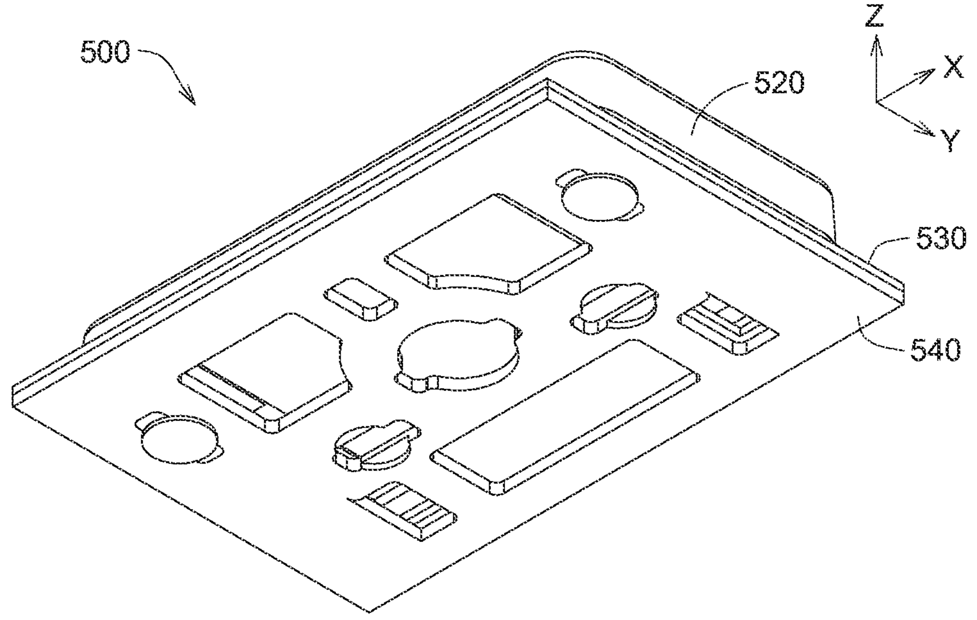
Figure 10A:
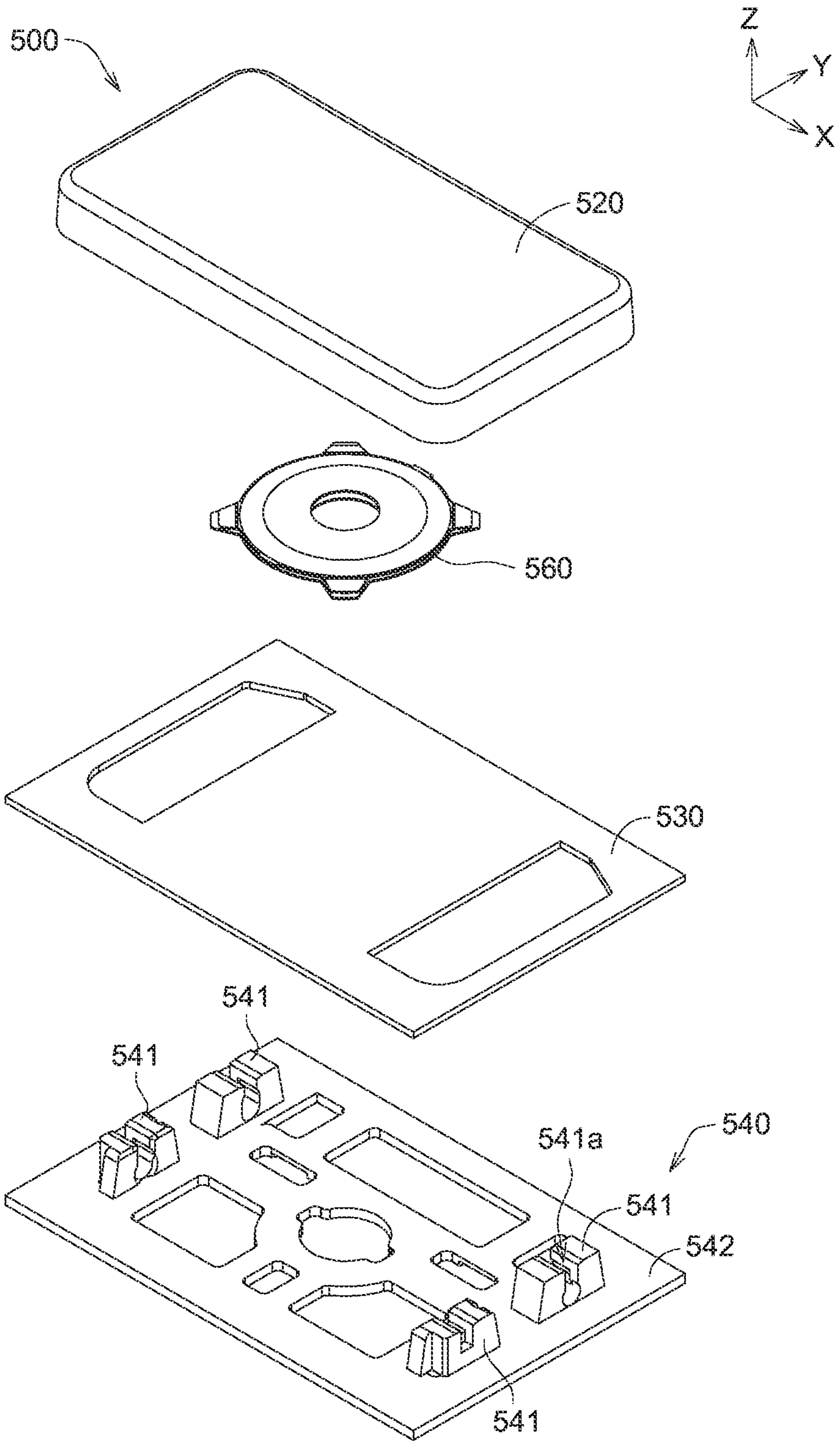
FIG. 10A shows a schematic diagram of an explosion view of the key structure in FIG. 9A.
Figure 10B:
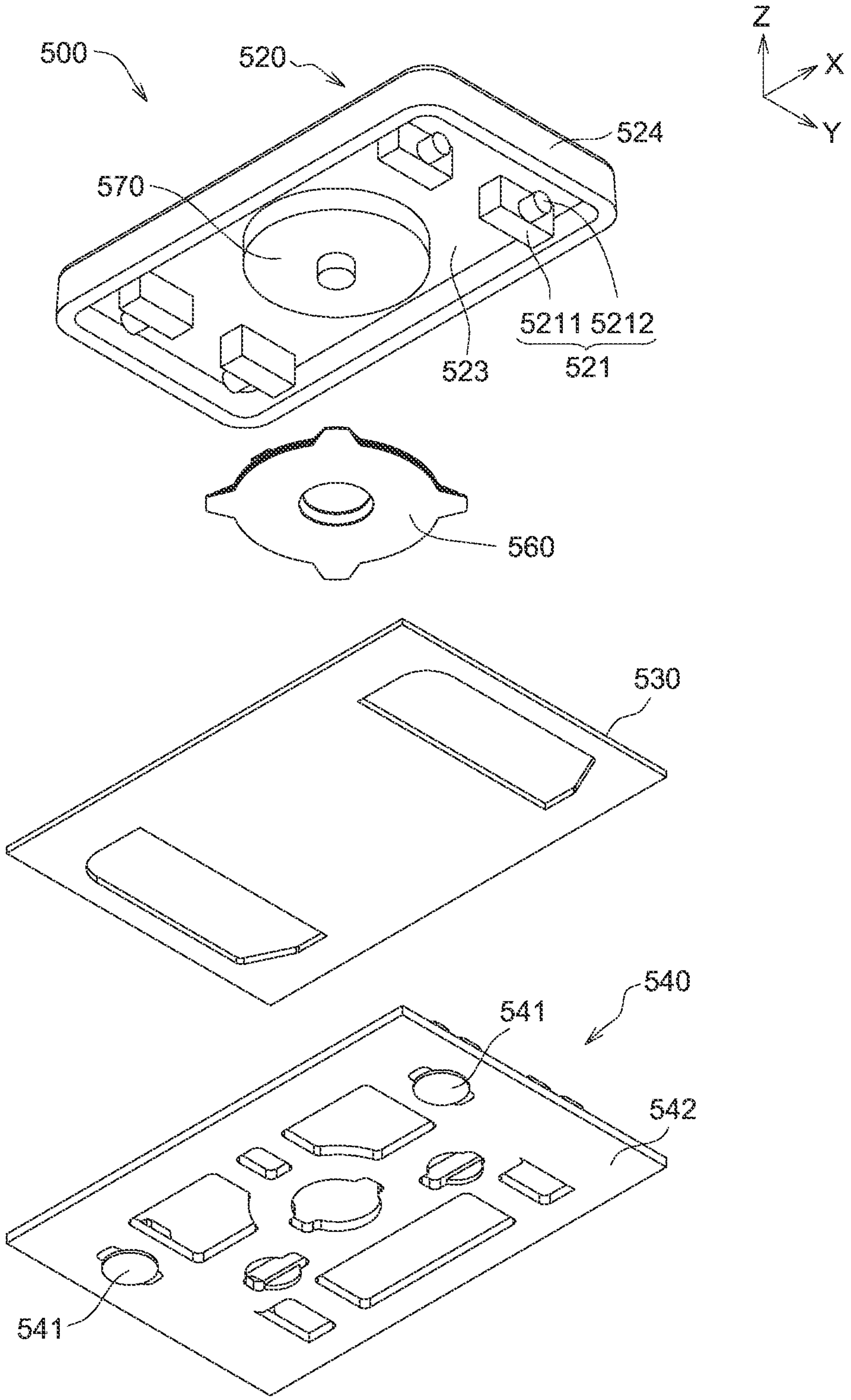
FIG. 10B shows a schematic diagram of an exploded view of the key structure 500 in FIG. 9B.
Figure 11A:
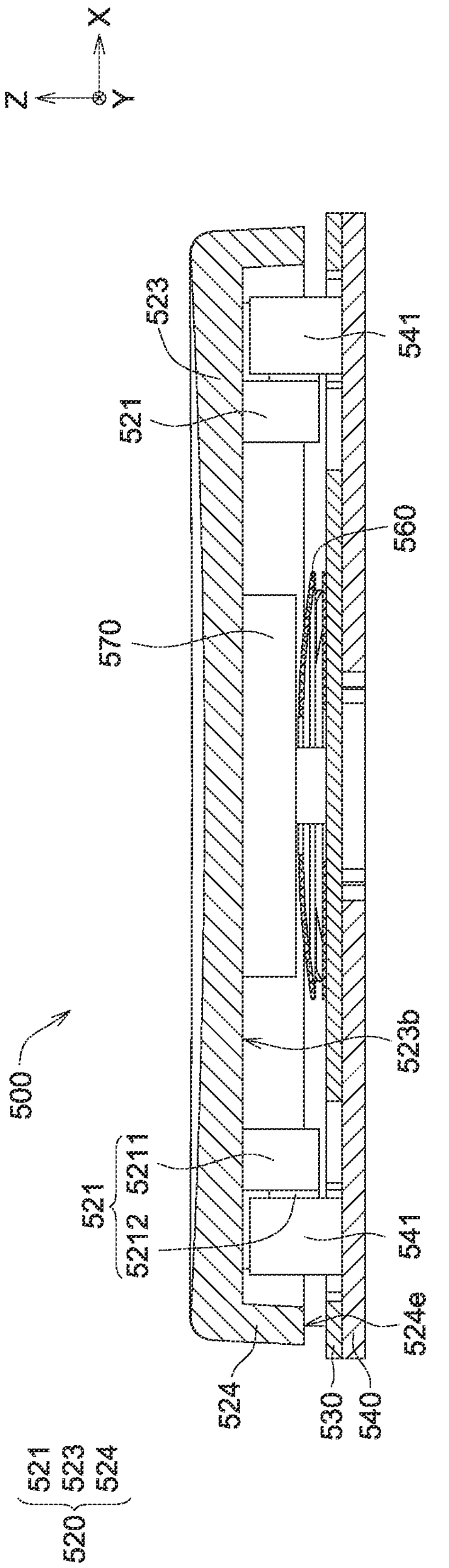
FIG. 11A shows a schematic diagram of a cross-sectional view of the key structure in FIG. 9A in a direction 11A-11A'.
Figure 11B:
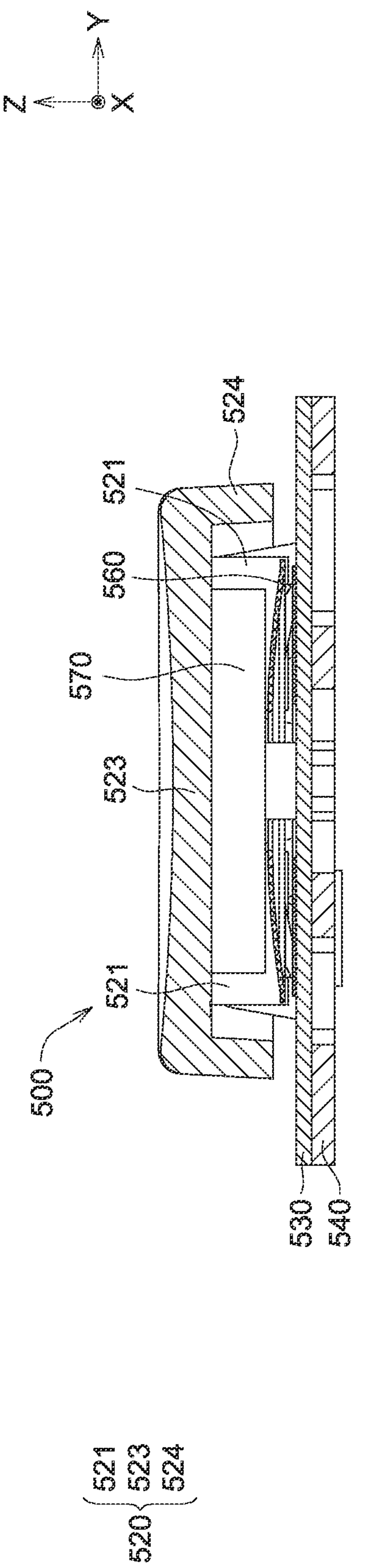
FIG. 11B shows a schematic diagram of the key structure in FIG. 9A in a direction 11B-116'.
Figure 11C:
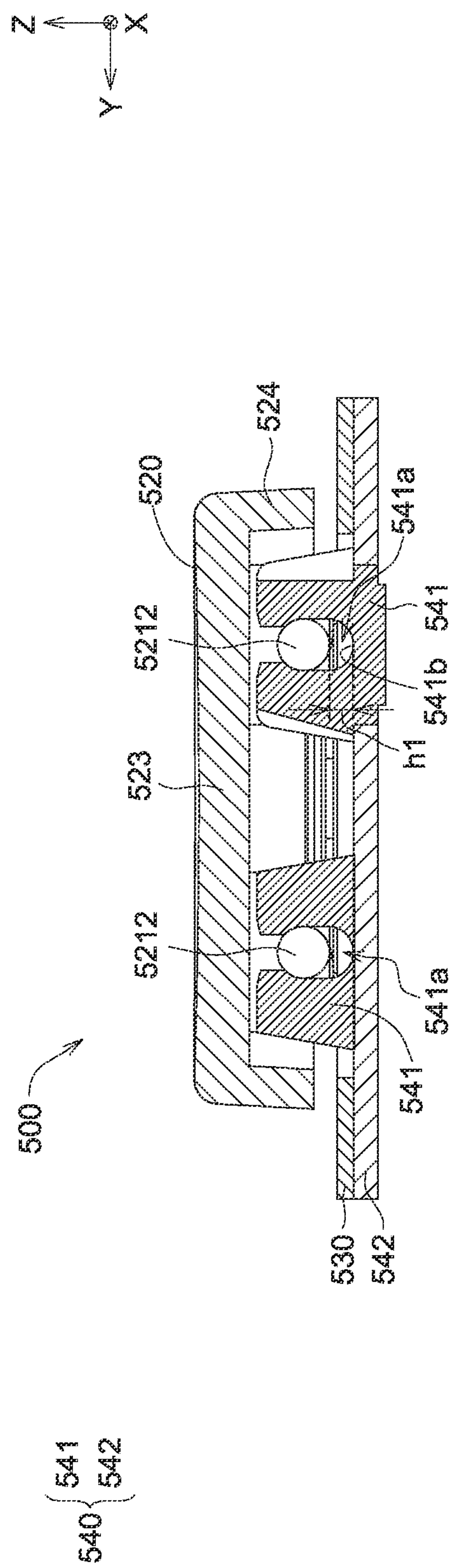
FIG. 11C shows a schematic diagram of a cross-sectional view of the key structure in FIG. 9A in a direction 11C-110'.
Figure 11D:
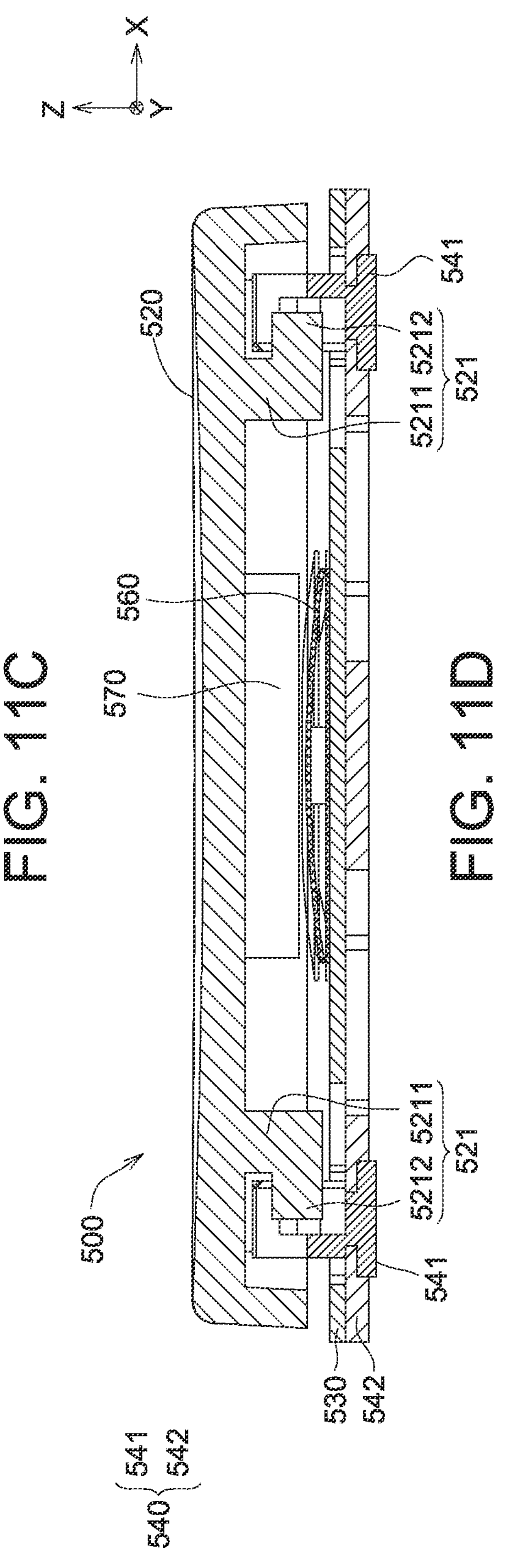
FIG. 11D shows a schematic diagram of the key structure in FIG. 9A in the pressed state.

Referring to FIGS. 9A to 11D, FIGS. 9A and 9B show schematic diagrams of combination views of a key structure 500 according to another embodiment of the present invention in different viewing angles, FIG. 10A shows a schematic diagram of an explosion view of the key structure 500 in FIG. 9A, FIG. 106 shows a schematic diagram of an exploded view of the key structure 500 in FIG. 9B, FIG. 11A shows a schematic diagram of a cross-sectional view of the key structure 500 in FIG. 9A in a direction 11A-11A', FIG. 116 shows a schematic diagram of the key structure 500 in FIG. 9A in a direction 11B-11B', FIG. 11C shows a schematic diagram of a cross-sectional view of the key structure 500 in FIG. 9A in a direction 11C-110', and FIG. 11D shows a schematic diagram of the key structure 500 in FIG. 9A in the pressed state. At least one key structure 500 may be installed on an electronic device (not shown), where the electronic device is, for example, a keyboard, a laptop, a home appliance, or other electronic devices that require an input interface.

As shown in FIGS. 9A and 10A, the key structure 500 includes a keycap 520, a spacer 530, a bracket 540, a switch 560 and a triggering portion 570. The spacer 530 is disposed between the keycap 520 and the bracket 540. In the present embodiment, the keycap 520 and the bracket 540 may be directly connected. In other words, the key structure 500 in the embodiment of the present invention does not require an additional lifting mechanism.

As shown in FIGS. 9A and 10A, the switch 560 is disposed between the triggering portion 570 and the spacer 530, wherein the switch 560 corresponds to the triggering portion 570 in position. In the present embodiment, the switch 560 may always (or constantly) abut on the triggering portion 570. In another embodiment, the switch 560 and the triggering portion 570 may maintain a gap (when the key structure 520 is in the released state). In an embodiment, the switch 560 may be the circuit element 150 or a part (for example, the switch 151) of the circuit element 150 in the previous embodiments (as shown in FIGS. 1A to 3F), and the switch 570 may be optionally disposed on a corresponding trigger circuit board. In another embodiment, the switch 560 may also be an elastic body, and the circuit board generates a trigger signal after the switch 560 is pressed.

In another embodiment, when the key structure 500 is in the pressed state, the switch 560 deforms and stores the elastic potential energy. After the key structure 500 is released, the switch 560 releases the elastic potential energy to drive the keycap 520 to reset. When the key structure 500 is in the pressed state, the switch 560 interferes with the triggering portion 570, so that the switch 560 generate the trigger signal.

As shown in FIGS. 10A and 10B, the keycap 520 includes at least one keycap connection portion 521, a top portion 523 and a peripheral portion 524. The peripheral portion 524 is connected to an edge of the top portion 523 and surrounds the top portion 523. The keycap connection portion 521 is connected to the top portion 523 and extends downward from the bottom surface 523*b* of the top portion 523. In addition, the keycap connection portion 521 may further protrude relative to a bottom surface 524*e* of the peripheral portion 524. The bracket 540 includes at least one bracket connection portion 541 and a body 542. The bracket connection portion 541 is combined with the body 542. The body 542 is formed of metal or plastic, for example. The bracket connection portion 541 is formed of plastic, for example. In terms of manufacturing process, the body 542 and the bracket connection portion 541 may be combined using, for example, double injection molding. In terms of appearance, the body 542 is, for example, a coplanar plate. That is, the body 542 itself may not have a bent portion protruding upward (towards the keycap 520). The keycap connection portion 521 and the bracket connection portion 541 may be connected along the lifting direction of the keycap 520 (for example, the Z-axis direction). Furthermore, the keycap connection portion 521 and the bracket connection portion 541 are movably and vertically connected.

As shown in FIG. 10B, the keycap connection portion 521 includes an extension section 5211 and a connection section 5212. The extension section 5211 is connected to the top portion 523. For example, the extension section 5211 is connected to a bottom surface 523*b* of the top portion 523 and extends downward from the bottom surface 523*b* of the top portion 523. The connection section 5212 is connected to a side of the extension section 5211 and laterally extends from the side of the extension section 5211. As shown in FIG. 10A, the bracket connection portion 541 has a connecting hole 541*a*. The connection section 5212 may be pivotally connected to the connecting hole 541*a*. The keycap connection portion 521 and the bracket 540 may be loosely matched. For example, the connecting section 5212 of the keycap connection portion 521 and the connecting hole 541*a* of the bracket 540 may be loosely matched. As a result, the connection section 5212 may move relative to the connecting hole 541*a*.

As shown in FIG. 11C, when the key structure 500 is in the released state, the keycap connection portion 521 and a bottom surface 541*b* of the connecting hole 541*a* are spaced from each other by an interval h1. In another embodiment, when the key structure 500 is in the pressed state, the keycap connection portion 521 is in contact with the bottom surface 541*b* of the connecting hole 541*a*. Furthermore, the aforementioned interval h1 may determine the lifting stroke of the keycap 520. For example, when the key structure 500 moves by the interval h1 toward the −Z-axis direction from the released state, the keycap connection portion 521 may abut on the bottom surface 541*b* of the connecting hole 541*a*. At this time, the keycap 520 is blocked and stops descending.

As shown in FIGS. 11C and 11D, in the released state, the switch 560 and the triggering portion 570 may maintain contact to block the keycap 520, thereby maintaining the interval h1 (it may prevent the keycap 520 from descending to eliminate the interval h1).

Figure 12A:
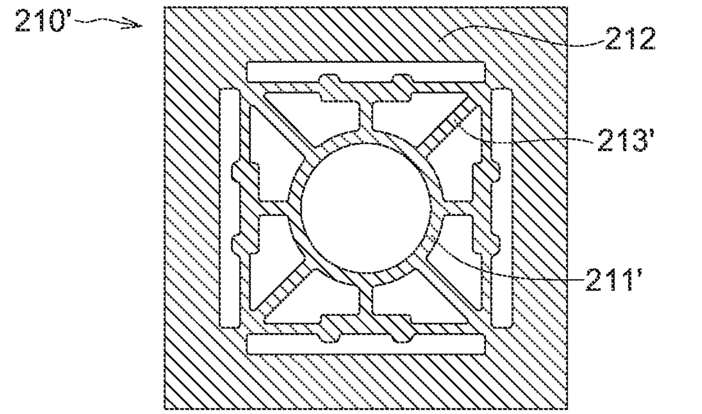
FIGS. 12A to 12C show schematic diagrams of elastic elements according to a plurality of the embodiments of the present invention.
Figure 12B:
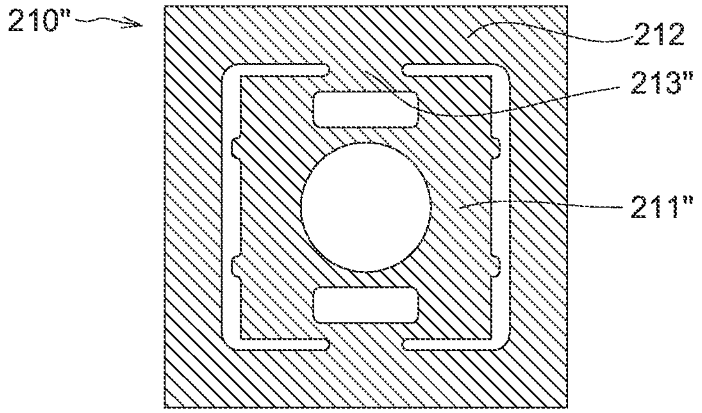
Figure 12C:
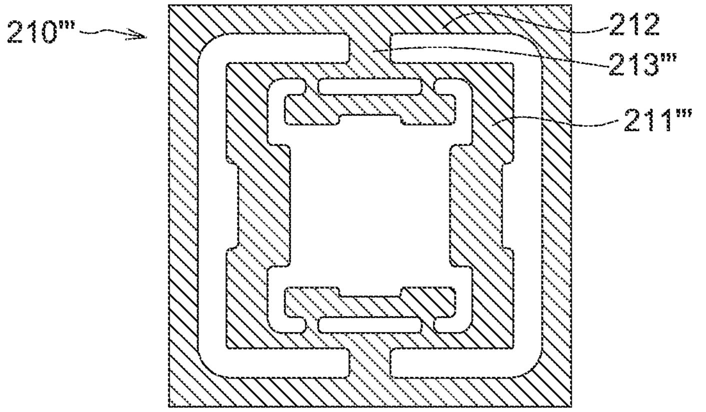

Referring to FIGS. 12A to 12C, FIGS. 12A to 12C show schematic diagrams of elastic elements according to a plurality of the embodiments of the present invention. The elastic elements 210, 310 and 410 of the key structures 200, 300, and 400 in the aforementioned embodiments may be replaced by one of the elastic elements 210' to 210'".

As shown in FIG. 12A, similar to the aforementioned elastic element 210, the elastic element 210' of the present embodiment includes at least one movable portion 211', at least one fixed portion 212 and at least one connection portion 213'. The fixed portion 212 surrounds the movable portion 211', and the connection portion 213' connects the fixed portion 212 with the movable portion 211'. Different from the elastic element 210, the connection portion 213' and the movable portion 211' of the elastic element 210' are different form the connection portion 213 and the movable portion 211 of the elastic element 210 in structure.

As shown in FIG. 12B, similar to the aforementioned elastic element 210, the elastic element 210" of the present embodiment includes at least one movable portion 211", at least one fixed portion 212 and at least one connection portion 213". The fixed portion 212 surrounds the movable portion 211", and the connection portion 213" connects the fixed portion 212 with the movable portion 211". Different from the elastic element 210, the connection portion 213" and the movable portion 211" of the elastic element 210" are different from the connection portion 213 and the movable portion 211 of the elastic element 210 in structure.

As shown in FIG. 12C, similar to the aforementioned elastic element 210, the elastic element 210''' of the present embodiment includes at least one movable portion 211''', at least one fixed portion 212 and at least one connection portion 213'''. The fixed portion 212 surrounds the movable portion 211''', and the connection portion 213''' connects the fixed portion 212 with the movable portion 211'''. Different from the elastic element 210, the connection portion 213''' and the movable portion 211''' of the elastic element 210''' are different from the connection portion 213 and the movable portion 211 of the elastic element 210 in structure.

As described above, as long as the connection portion of the elastic element may connect the movable portion and the fixed portion, and may provide sufficient elasticity or flexibility, the embodiment of the present invention does not limit a geometric structure of the connection portion and the movable portion.

A key structure of the embodiment of the present invention at least includes a bracket and a keycap, wherein the keycap may be directly or indirectly connected to the bracket. As a result, an additional lifting mechanism such as a scissor mechanism or a butterfly mechanism is not required. In an embodiment, the bracket is, for example, an elastic element. In another embodiment, the bracket is, for example, a bottom plate (or base plate) with a bent portion (for example, formed by sheet metal processing), or a bottom plate combined with a bracket connection portion (for example, double injection molding). The elastic element has elasticity, so it may store elastic potential energy after deformation (for example, when the keycap is in the pressed state). When the keycap is released, the elastic element releases the elastic potential energy, thereby driving the keycap and the elastic element to reset. In an embodiment, the elastic element is, for example, an integrally formed elastic piece, which allows at least one keycap to be assembled thereon.

While the invention has been described by way of example and in terms of the preferred embodiment (s), it is to be understood that the invention is not limited thereto. Based on the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. A key structure, comprising:
an elastic element, comprising:
a movable portion;
a fixed portion surrounding the movable portion; and
a connection portion connecting the fixed portion with the movable portion; and
a keycap disposed on the elastic element, comprising:
a top portion having a lower surface;
a peripheral portion extending toward the elastic element from the lower surface of the top portion; and
a first connection portion connected to the peripheral portion and in contact with a lower surface of the elastic element, wherein the lower surface of the elastic element faces away from the keycap.

2. The key structure as claimed in claim 1, wherein the keycap further comprises a second connection portion corresponding to the movable portion, and the second connection portion of the keycap abuts on the movable portion when the key structure is in a released state.

3. The key structure as claimed in claim 1, wherein the movable portion, the connection portion and the fixed portion are coplanar when the key structure is in a released state.

4. The key structure as claimed in claim 1, wherein the elastic element further comprises a triggering portion connected to the movable portion, the key structure further comprises a switch disposed between the keycap and the elastic element at a position corresponding to the triggering portion.

5. The key structure as claimed in claim 1, further comprising a trigger body disposed at a position corresponding to a through hole of the movable portion of the elastic element.

6. The key structure as claimed in claim 1, further comprising a spacer having an upper surface, wherein the fixed portion has a lower surface abutting on the upper surface of the spacer.

7. The key structure as claimed in claim 1, wherein the movable portion,
the fixed portion and the connection portion are an integrally-formed sheet.

8. The key structure as claimed in claim 1, wherein the keycap further comprises a second connection portion corresponding to the movable portion, and the second connection portion comprises a positioning section and an abutting section, wherein the abutting section is connected to the positioning section and has a lower surface facing the movable portion, and the positioning section protrudes relative to the abutting section and passes through the elastic element.

9. The key structure as claimed in claim 1, wherein the elastic element comprises a plurality of elastic units each comprising the fixed portion, and the fixed portions of two adjacent elastic units are connected together.

10. The key structure as claimed in claim 1, further comprising a spacer, wherein the fixed portion of the elastic element is located above the spacer.

11. The key structure as claimed in claim 10, further comprising:
a bracket; and
a circuit layer;
wherein the spacer and the circuit layer are fixed between the bracket and the elastic element.

12. The key structure as claimed in claim 10, further comprising a trigger body disposed at a position corresponding to a hollow portion of the spacer.

13. The key structure as claimed in claim 1, wherein a groove is disposed between the movable portion and the fixed portion.

14. The key structure as claimed in claim 13, wherein the first connection portion comprises a connection section, and the connection section has an inclined surface overlapping the groove in a lifting direction of the keycap.

15. A key structure, comprising:
a bracket;
a keycap disposed on the bracket;
a trigger body disposed between the keycap and the bracket; and
a switch disposed at a position corresponding to the trigger body;
wherein the keycap is directly connected to the bracket;
wherein the switch is disposed between the keycap and the bracket;
wherein the trigger body does not engage with the bracket.

16. The key structure as claimed in claim 15, wherein the keycap comprises a keycap connection portion, the bracket comprises a bracket connection portion connected to the keycap connection portion in a lifting direction of the keycap.

17. The key structure as claimed in claim 15, wherein the keycap comprises a peripheral portion and a keycap connection portion, and the keycap connection portion protrudes relative to a bottom surface of the peripheral portion.

18. The key structure as claimed in claim 15, wherein the keycap comprises a key cap connection portion, and the bracket has a connecting hole; the key cap connection portion is spaced from a bottom surface of the connecting hole by an interval when the key structure is in a released state; the key cap connection portion abuts on the bottom surface of the connecting hole by an interval when the key structure is in a pressed state.

19. The key structure as claimed in claim 15, wherein the bracket comprises:

a body; and a bracket connection portion combined with the body and having a connecting hole, wherein an extension direction of the connecting hole is parallel to a lifting direction of the keycap.

* * * * *